United States Patent

Sudia et al.

[11] Patent Number: 5,995,625
[45] Date of Patent: Nov. 30, 1999

[54] ELECTRONIC CRYPTOGRAPHIC PACKING

[75] Inventors: Frank W. Sudia, Newton Centre, Mass.; Alan Asay, Salt Lake City, Utah; Ernest F. Brickell, Albuquerque, N.Mex.; Richard Ankney, Chantilly, Va.; Peter C. Freund; Marcel M. Yung, both of New York, N.Y.; David W. Kravitz, Albuquerque, N.Mex.

[73] Assignee: Certco, LLC, New York, N.Y.

[21] Appl. No.: 08/822,732

[22] Filed: Mar. 24, 1997

[51] Int. Cl.$^6$ .................................................. H04L 9/00
[52] U.S. Cl. .................................................. 380/25; 380/4
[58] Field of Search ........................................ 380/4, 25

[56] References Cited

U.S. PATENT DOCUMENTS

| | | |
|---|---|---|
| 4,528,643 | 7/1985 | Freeny, Jr. . |
| 4,827,508 | 5/1989 | Shear ........................................... 380/4 |
| 4,941,175 | 7/1990 | Enescu et al. . |
| 4,953,209 | 8/1990 | Ryder, Sr. et al. ........................ 380/25 |
| 4,977,594 | 12/1990 | Shear ........................................... 380/4 |
| 5,050,213 | 9/1991 | Shear ........................................... 380/4 |
| 5,138,712 | 8/1992 | Corbin . |
| 5,343,526 | 8/1994 | Lassers . |
| 5,343,527 | 8/1994 | Moore ......................................... 380/4 |
| 5,390,297 | 2/1995 | Barber et al. . |
| 5,400,403 | 3/1995 | Fahn et al. .................................. 380/4 |
| 5,509,074 | 4/1996 | Choudhury et al. ....................... 380/25 |
| 5,553,143 | 9/1996 | Ross et al. .................................. 380/4 |
| 5,555,303 | 9/1996 | Stambler ..................................... 380/4 |
| 5,586,186 | 12/1996 | Yuval et al. ................................. 380/4 |
| 5,701,343 | 12/1997 | Takashima et al. ........................ 380/4 |
| 5,708,709 | 1/1998 | Rose ............................................ 380/4 |

FOREIGN PATENT DOCUMENTS

| | | |
|---|---|---|
| 0 715 242 | 6/1966 | European Pat. Off. . |
| 0 444 351 | 9/1991 | European Pat. Off. . |

OTHER PUBLICATIONS

International Search Report, dated Aug. 7, 1998; PCT/US98/04329.

*Primary Examiner*—Salvatore Cangialosi
*Attorney, Agent, or Firm*—Pillsbury Madison & Sutro, LLP

[57] ABSTRACT

A method of unwrapping wrapped digital data that is unusable while wrapped, includes obtaining an acceptance phrase from a user; deriving a cryptographic key from the acceptance phrase; and unwrapping the package of digital data using the derived cryptographic key. The acceptance phrase is a phrase entered by a user in response to information provided to the user. The information and the acceptance phrase can be in any appropriate language. The digital data includes, alone or in combination, any of: software, a cryptographic key, an identifying certificate, an authorizing certificate, a data element or field of an identifying or authorizing certificate, a data file representing an images, data representing text, numbers, audio, and video.

42 Claims, 20 Drawing Sheets

Fig. 5

| 38 | 40 Certificate Number | 42 CA Name | 44 Subscriber Name | 46 Algorithm OID | 48 Subscriber Public Key | 50 Extension Phrase | 52 Extension Policy | 54 Validity Period | 56 Other Information | 58 Other Cryptographic Key Information | 60 CA Signature |

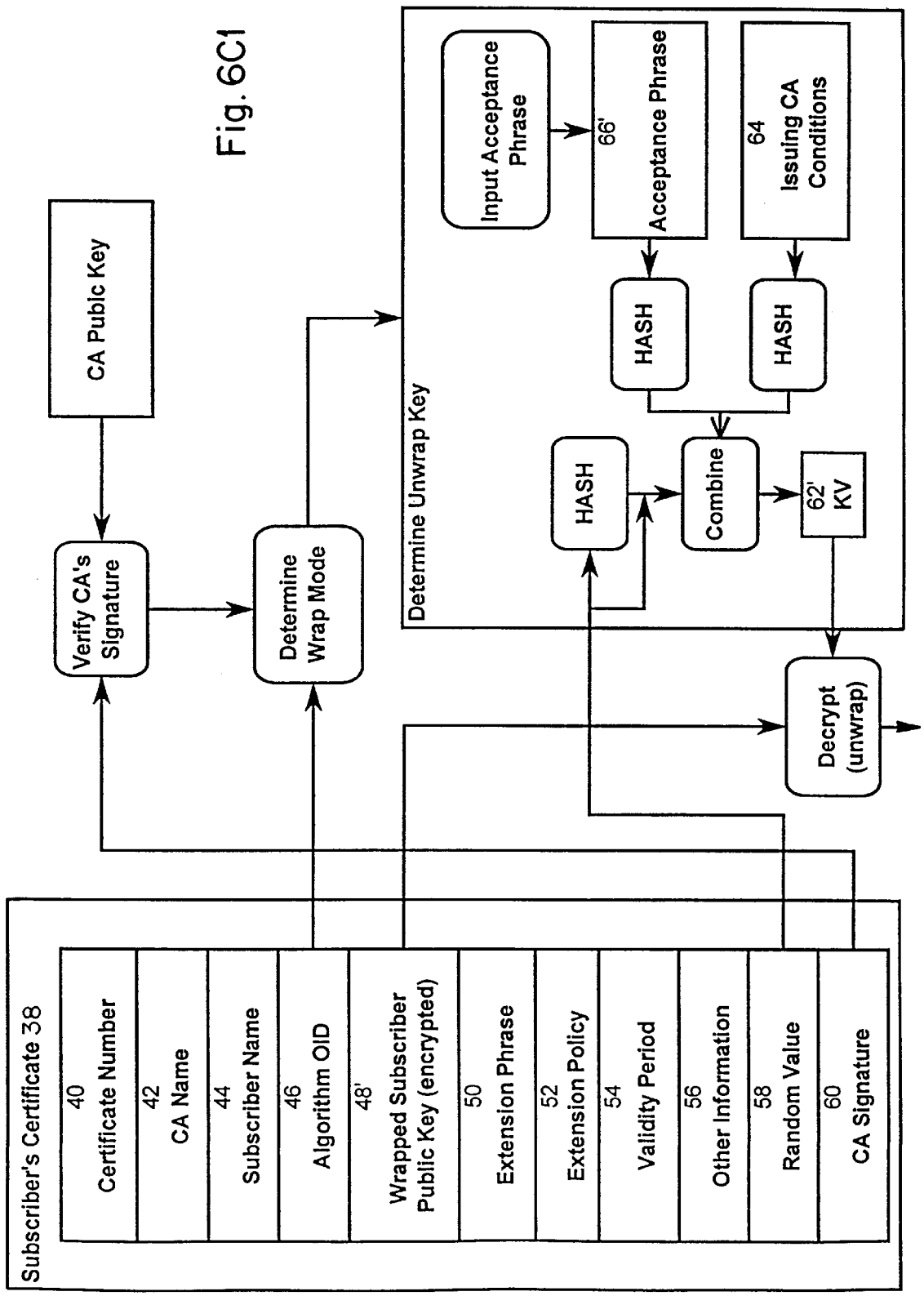

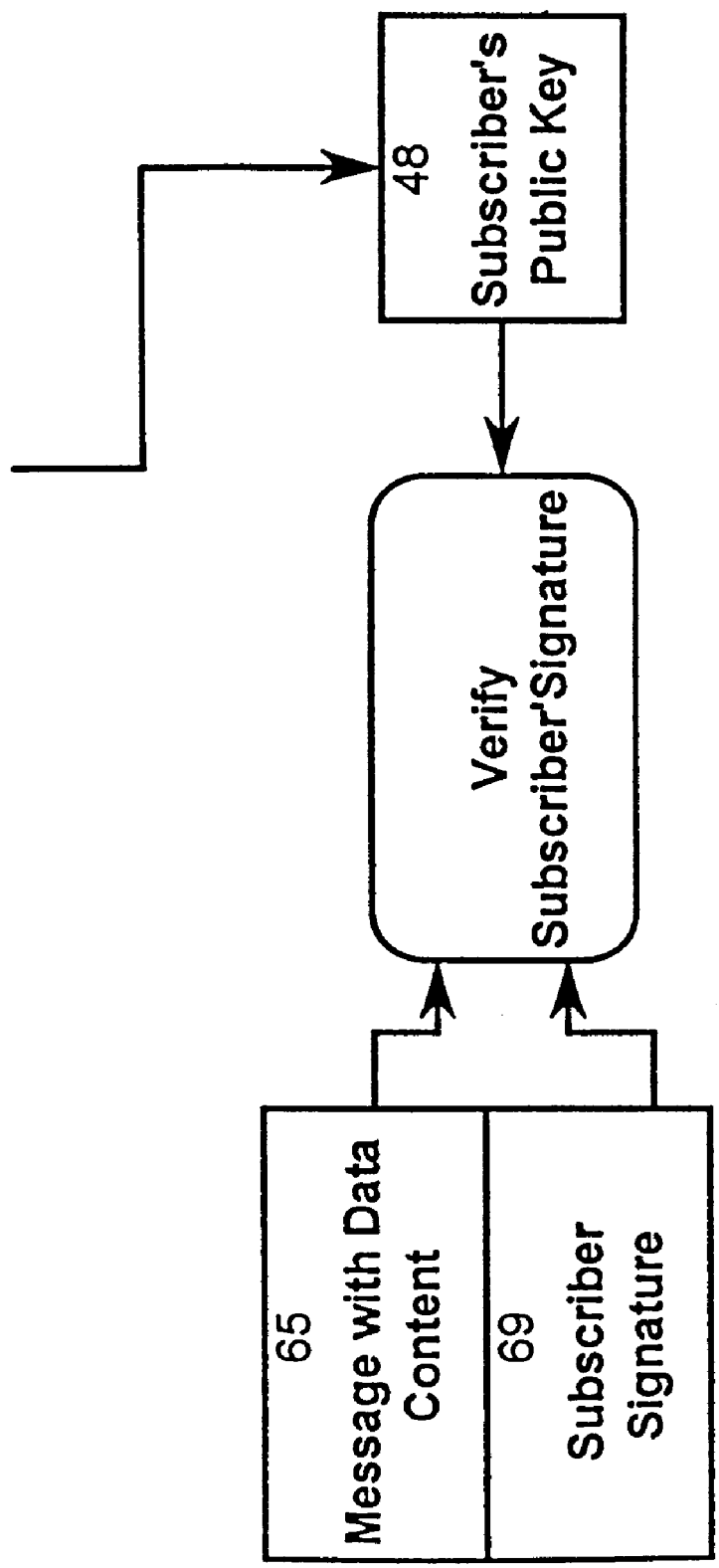
Fig. 6C2

ELECTRONIC CRYPTOGRAPHIC PACKING

FIELD OF THE INVENTION

This invention relates to packing of digital data, and, more particularly, to packing digital data such that the packaged data is unusable while packed and such that the packaged data must be unpacked to be used. This invention further relates to the digital signing of such packed data such that any guarantees of origin authentication and legal liability of the signer are unavailable with regard to the data in an unpacked state.

BACKGROUND OF THE INVENTION

When delivering digital data such as computer software, data files, cryptographic certificates and the like to end users, there is typically a desire to bind the end users to various terms, provisions, policies, rules or the like, collectively referred to herein as conditions relating to the use of that data.

To deal with this desire, over the last fifteen years or so, a legal doctrine known as shrink-wrap licensing has evolved. Using shrink-wrap licensing, a software license agreement is printed onto a software package, and the physical act of tearing off the shrink wrap plastic is held to constitute an objective manifestation of assent to the license terms. More recently, a doctrine known as click-wrap licensing has begun to be recognized. In click-wrap licensing, the user is provided with a license agreement (either displayed on a computer screen or in some other manner). The user's action of clicking a mouse key with the computer's cursor positioned on a screen button labeled with some words of assent, for example, the phrase "I Agree" or equivalent, is deemed to constitute proof of assent by the end user to the displayed license terms.

When the goods being delivered are software intended for use in electronic commerce, the problem of binding the user to the terms and conditions of an electronic transaction system (generally known as system rules) is very important. Not only must the user be bound to perform (prepare and send) his own transactions according to certain rules, but he must also agree to reject certain transactions sent to him by other participants if those transactions violate certain rules. An example of this is the obligation of a recipient to disregard a transaction which does not match the authorization given to its sender, when verified according to the electronic commerce system being employed by the recipient.

Delivery to an end user of electronic (digital) goods in an encrypted (or scrambled) state is known. It is also known to subsequently deliver an appropriate decryption key to the end user, only upon fulfillment of some condition, such as arranging for payment for the goods. In such cases, users do not know the decryption key until they receive it in exchange for payment, or until they fulfill some other conditions (such as registering use of the goods).

Various schemes also exist in which an on-line service sign-up process involves entering a credit card number followed by a formalistic typing of words of assent such as "I Agree" in reference to the terms of service. However, in those cases, while the program requires the words to be entered in order to proceed, there is no decryption step involved, only recognition of the phrase.

SUMMARY OF THE INVENTION

It is desirable to provide a mechanism to prove that an end user of a digital product agreed to various conditions for use of that product. Accordingly, this invention provides a digital data product that is wrapped using a key generated from a particular assent or acceptance phrase and from conditions of use of the digital data. The acceptance phrase is a phrase indicating assent to the conditions.

When an end user obtains the wrapped digital data he must have the conditions and must enter the acceptance phrase in order to unwrap and then use the unwrapped data. The textual conditions and the acceptance phrase are the same conditions and phrase that were used to wrap the data. Since it is computationally infeasible to find another phrase that could unwrap the data, it can be assumed that if the data is unwrapped the correct acceptance phrase was used. In other words, if an end user uses the digital data, it can be assumed that the user entered the acceptance phrase in order to unwrap the data. That is, the end user must have assented to the conditions of use of the data.

In general, this invention operates on a computer system which includes a computer with a processor (CPU) which executes programs in a memory in a known manner. The computer may also include special purpose hardware such as a DES processor or the like. The computer system generally includes an input device such as a keyboard, a display monitor and some form of external storage such as a disk drive or the like. The computer can be connected to a network such as a LAN, a WAN, the Internet or the like.

The invention can also operate on special purpose computer systems which include additional hardware to perform some of the more computationally intensive tasks. Aspects of the invention can also be performed using special purpose hardware.

In one aspect, this invention is a method of packing or wrapping digital data and of unpacking or unwrapping packaged (wrapped) digital data. Preferably the packed digital data is unusable while packed. The method includes obtaining a particular pass phrase, the pass phrase indicating acceptance of conditions of use of the digital data and then deriving a key from at least the pass phrase. Preferably the key is a cryptographic key. Using the thus derived key, the digital data is then either packed (wrapped) or unpacked (unwrapped).

Generally, the terms "wrap" and "pack" are used synonymously herein, as are the terms "unwrap" and "unpack."

When unpacking, preferably the pass phrase is a phrase entered by a user in response to information provided to the user. Preferably, the provided information comprises conditions for use of the digital data and the pass phrase is a phrase indicating acceptance to those conditions.

The information can be presented in any language and the pass phrase is preferably a phrase in the same language. In some preferred embodiments, steps are taken to ascertain whether the user understands at least some of that language. These steps include asking questions in that language and analyzing the answers.

The digital data can be any form of data including, but not limited to, computer programs, video data, audio data, multimedia data, cryptographic data and the like, where cryptographic data includes all or part of cryptographic certificates and cryptographic keys.

As noted above, in one aspect this invention includes obtaining a particular pass phrase indicating acceptance of conditions of use of digital data. The conditions of use of the data can be specific to the data or they can vary from user to user, over time or in some other fashion.

In some preferred embodiments, the data comprise a subscriber's public key in a public key infrastructure (PKI), and the packaged public key is contained in a cryptographic certificate issued by a certification authority (CA) to that subscriber. In these embodiments, the invention includes forming a key value from a combination of an acceptance phrase and an issuing CA policy statement (the conditions); encrypting the subscriber's public key with the key value and then inserting the encrypted public key into the subscriber's certificate. Preferably the key value is a fifty-six-bit DES key formed by an exclusive-or (XOR) of the hash of each of the acceptance phrase and the conditions. The hash is performed using a cryptographic hash function such as SHA-1, MD5 or the like. The encryption is preferably performed using a symmetric encryption algorithm such as DES or the like. Accordingly, the wrap and unwrap key values are generally the same.

In these embodiments, when a party receives a digitally signed message from a subscriber, in order to verify the subscriber's signature on the message, the party has to unwrap (decrypt) the subscriber's encrypted public key in the subscriber's certificate. To do this, the receiving party is provided with the text of the conditions and must generate the appropriate key value by entering the correct acceptance phrase. The key value is then used to decrypt the encrypted subscriber's public key.

In some preferred embodiments, the wrapping is applied to the root key of a public key infrastructure. In these cases, access to the root key is only provided to someone typing the acceptance phrase.

In some preferred embodiments, the data comprise some function of the contents of a subscriber's cryptographic certificate in a public key infrastructure. Preferably the function is a hash of the contents of the certificate.

In these embodiments, the key value is formed the same way as above, using a combination of the issuing CA's conditions (policy statement) and an acceptance phrase. Then the content of the subscriber's certificate is hashed and the hash is encrypted using the key value so obtained. The encrypted hash is then digitally signed by the issuing CA's private key and appended to the certificate. In order to verify the CA's signature, the certificate content must be hashed and encrypted with the same conditions and acceptance phrase. The signed hash appended to the certificate is then verified using the CA's public key and the encrypted hash generated by the user. If the verification computation is successful, then the CA's signature is valid.

In some preferred embodiments, the data comprise a function of a message with data content in a public key infrastructure. Preferably the function is a hash of the message.

In some embodiments the wrapping key is formed from other data, including, but not limited to randomly generated data. In these embodiments the other data is provided to the end users to enable them to form an unwrapping key. In the case when the data comprise digital certificates, the other data can be included in the digital certificates.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIG. 5 depicts the form of an X.509 cryptographic certificate used in various embodiments and applications of the present invention in a public key infrastructure;

FIGS. 6A–6C show the application of this invention to wrapping and unwrapping a subscriber's public key in a cryptographic certificate issued in a public key infrastructure;

DETAILED DESCRIPTION OF THE PRESENTLY PREFERRED EXEMPLARY EMBODIMENTS

The present invention operates in two distinct phases. In a first or packing or wrapping phase, digital data is wrapped, for example, by a manufacturer or distributor, such that the wrapped data is unusable until unpacked and such that the wrapped data must be unpacked by a key formed using a particular phrase. In a second or unpacking or unwrapping phase, the wrapped digital data is unwrapped by an end-user using a key formed from the particular phrase. By unwrapping the data with particular phrase, the user provides proof that the phrase was actually entered.

The digital data which is wrapped includes, but is not limited to, alone or in combination, software, cryptographic keys, identifying or authorizing certificates in a public key infrastructure, data files representing images, text, numbers, or audio and the like.

Figure 13:
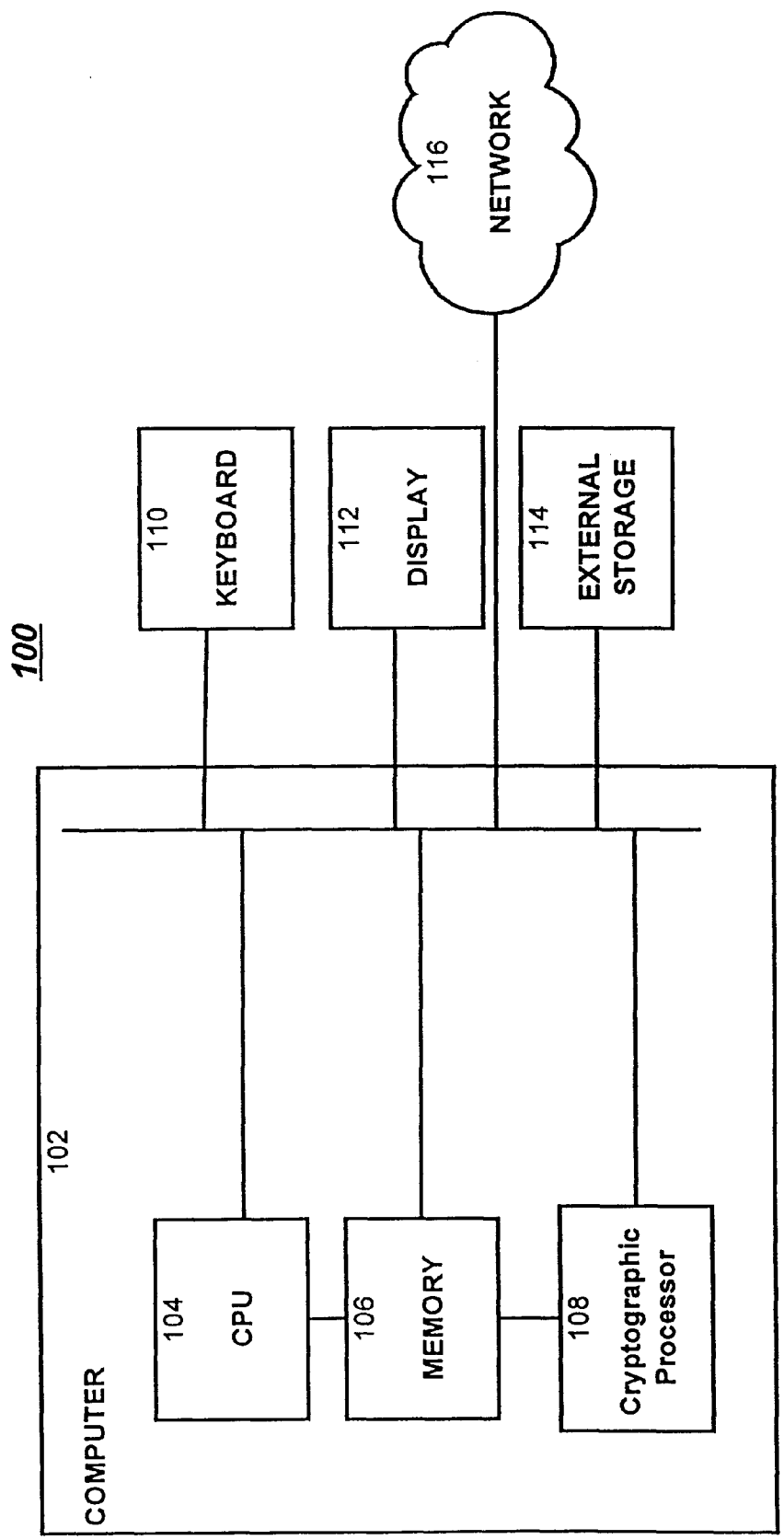
FIG. 13 shows a computer system on which the present invention operates.

In general, this invention operates on any general purpose computer system such as computer system 100 shown in FIG. 13. As shown in FIG. 13, computer system 100 includes a computer 102 which has a processor (CPU) 104 connected to a memory 106. The CPU 104 executes programs in memory 106 in a known manner. The computer 102 may also include special purpose cryptographic hardware 108 such as a DES processor or the like. The computer system 100 typically includes an input device such as a keyboard 110, a display monitor 112 and some form of external storage 114 such as a disk drive or the like. The computer 102 can be connected to a network 116 such as a LAN, a WAN, the Internet or the like.

The invention can also be made to operate on special purpose computer systems which include additional hardware to perform some of the more computationally intensive tasks. Similarly, while aspects of the invention can be performed by computer programs programmed for a general purpose computer, aspects of the invention can be performed using special purpose hardware.

The present invention can be implemented as part of the processor 104 (and/or cryptographic processor 108) or as a program residing in memory 106 and running on the processor 104 (and/or cryptographic processor 108), or as a combination of program and specialized hardware. When in memory 106, the program can be in a RAM, a ROM, an internal or external disk, a CD ROM, an ASIC or the like. In general, when implemented as a program or in part as a program, the program can be encoded on any computer-readable medium or combination of computer-readable media, including but not limited to a RAM, a ROM, a disk, an ASIC, a PROM and the like.

The wrapping mode of the invention is now described with reference to FIGS. 1, 2 and 13.

First, digital data representing conditions 10 are provided to the computer 102 (at P10) either via the network 116 or from external storage 114. A digest function 12 such as a hashing function SHA-1 or the like is applied to the data 10 by CPU 104 (or, if provided, by cryptographic hardware 108) to produce a digest (hash) 14 of the conditions (at P12). This digest 14 is temporarily stored in memory 106.

The data representing the conditions 10 can be user specific, data specific or variable. For example, the data 10 can be different for every user or they can be the same for all users of the same data. Similarly, the data 10 can vary by geographic region, time or day or by other variables. For example, a user in New York on a Saturday may have different conditions to users in California on weekdays.

An acceptance phrase 16 is determined (at P14) and entered using keyboard 110 (or any other form of input including reading it from the external storage 114 or from the network 116) and is digested (hashed) by CPU 104 (or, if provided, by cryptographic hardware 108) using digest function 18 to produce a digest of the acceptance phrase 20 (at P16). This digest of the acceptance phrase 20 is also temporarily stored, for example, in memory 106.

Optionally, other data 22 such as, for example, randomly generated data are provided (at P18) to the computer system 100. The other data 22 can, in some cases, be derived from some or all of the actual data 32 to be wrapped. For example, the other data 22 may be a hash of some or all of the actual data 32. In some cases the other data 22 are digested by the computer 102 using digest function 24 to produce a digest of the other data 26 (at P20). In other cases the other data 22 are used directly without first being digested.

Digest functions 12, 18, and 24 can all be the same digest function or they can be different from each other. Preferably they are each a hashing function such as SHA-1 or the like. In some embodiments the digest functions 12, 18 and 24, need not be cryptographic functions and may be a reproducible, deterministic function. As noted above, the digest functions are executed on CPU 104, however, they can be implemented using special purpose hardware such as cryptographic hardware 108. The intermediate results of the digesting (at P12, P16 and P20) are stored, as needed, in memory 106 or elsewhere.

The various digested data (formed at P12, P16 and P20) are then combined by computer 102 using combine function 28 to form a wrap key value 30. That is, the digest of the conditions 14, the digest of the acceptance phrase 20, and, if provided, the digest of the other data 26 (or the other data 22 directly) are then combined using combine function 28 to produce a wrap key value 30 (at P22).

Preferably the combine function 28 is an exclusive-or (XOR) function or the like producing a 56-bit DES key and is performed using CPU 104 or cryptographic hardware 108. The combine function 28 can also be a hash function or any other function which can produce the appropriate key from its input data. In particular, the combine function 28 need not be a cryptographic function, as long as it is reproducible and deterministic.

Next data 32 to be wrapped is provided (at P24) to the computer system 100 and is wrapped (at P26) by the computer 102 using wrap function 34 to produce wrapped data 36. Preferably the wrap function is an encryption function such as DES or the like and the wrapping of the data 32 (at P26) comprises encrypting the data 32 with the encryption function wrap key value 30. In some embodiments the wrapping is non-cryptographic, with the wrap 34 being some reversible way of combining the data 32 and the wrap key 30. The wrapping is performed by the CPU 104 or by any special purpose cryptographic hardware 108.

The data 32 to be wrapped can be provided via the network 116, from external storage 114 such as a floppy disk or the like, or can be input using the keyboard 110.

In summary, in the first or wrapping phase, first a wrap key value 30 is formed from an acceptance phrase 16, digital data representing conditions 10 and, optionally, other data 22. The wrap key value is then used to wrap the data 32 to produce wrapped data 36.

Figure 3:
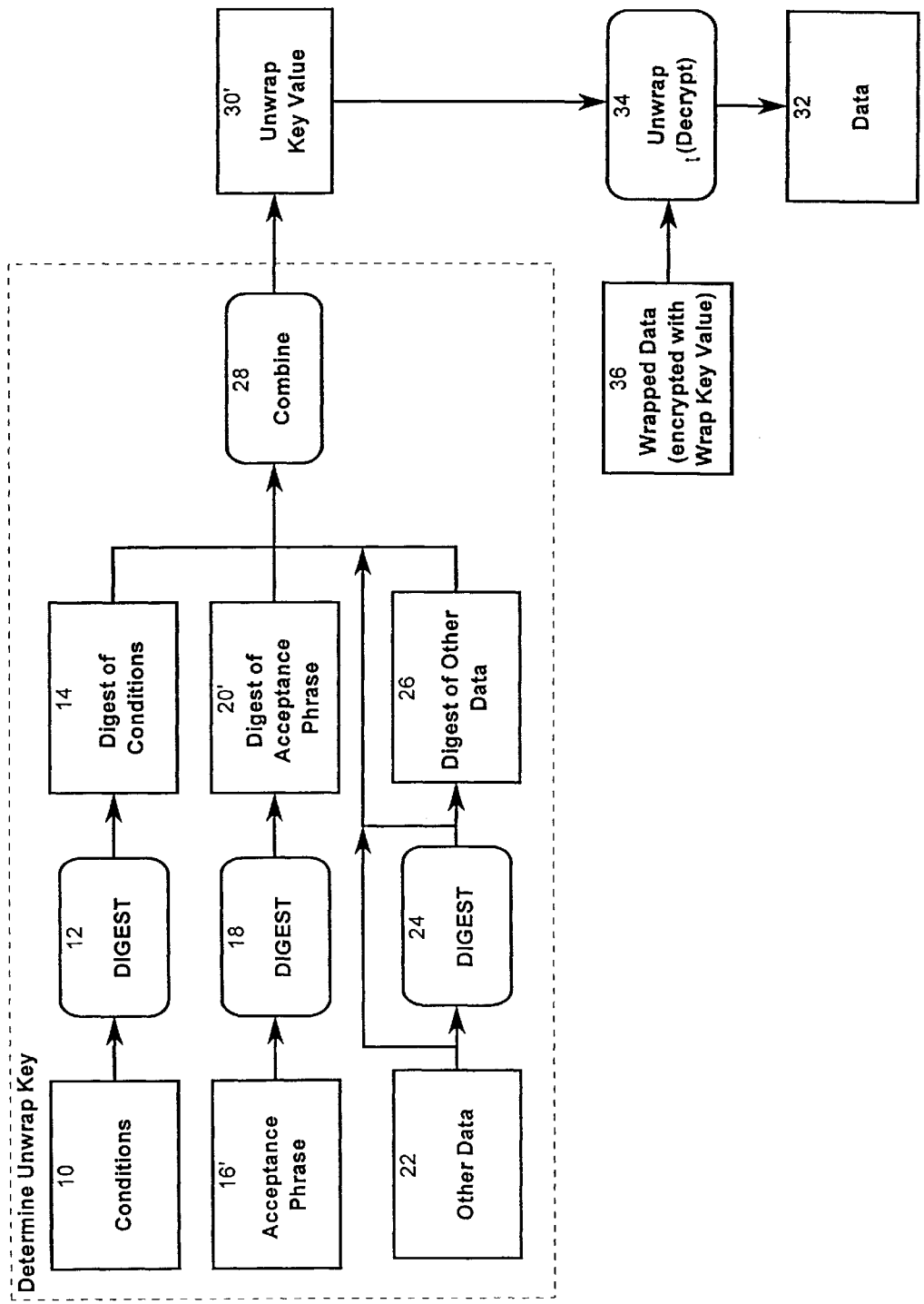
FIGS. 3 and 4 show the general unwrapping of data wrapped according to the process of FIG. 2.
Figure 4:
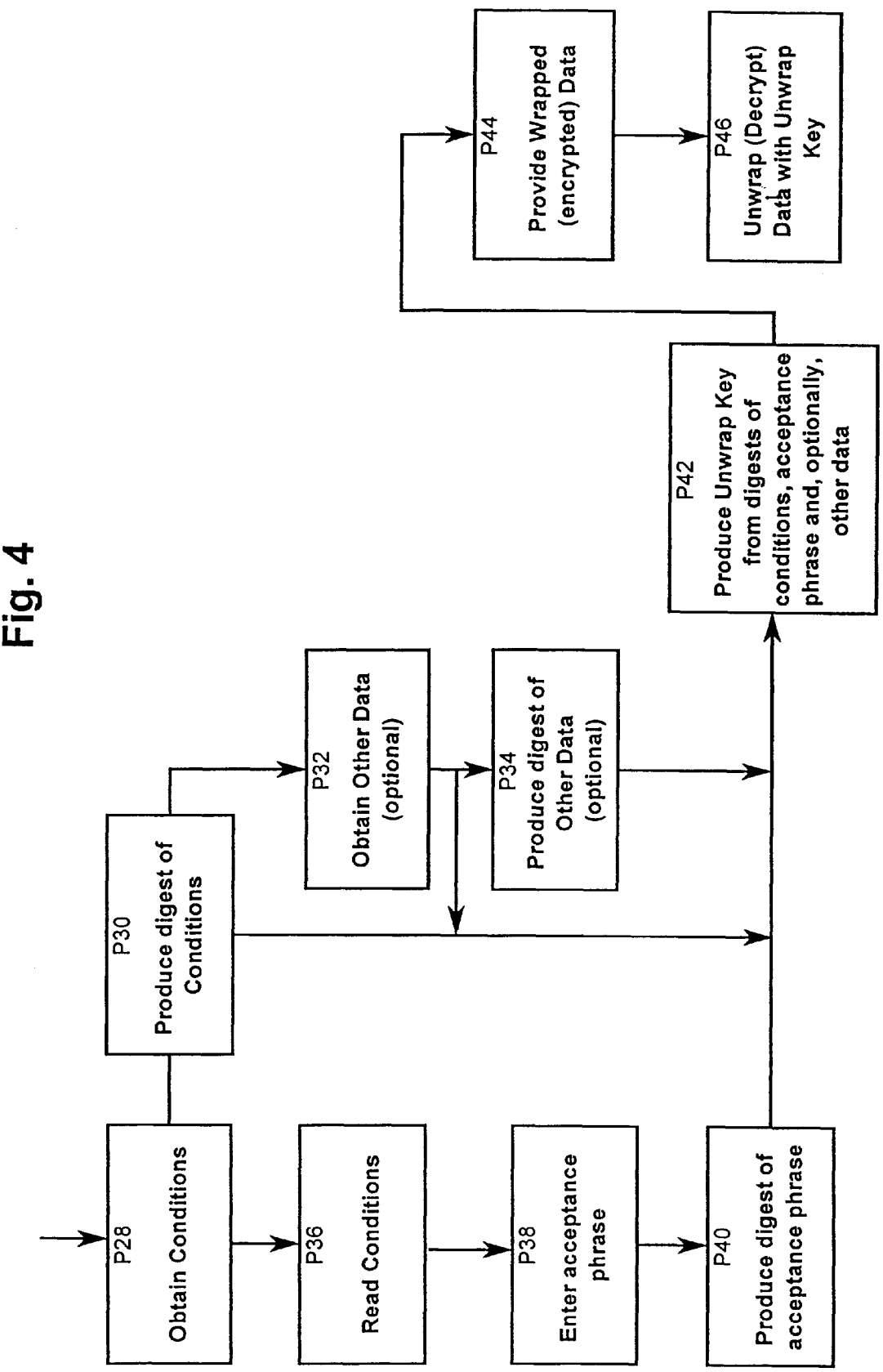

This wrapped data 36, along with the conditions 10 can now be provided to others who, when they wish to use it, must unwrap it as shown in FIGS. 3, 4 and 13, and described below.

An end-user wishing to unwrap data wrapped according the process described above must first form the appropriate unwrap key value. To do this, the user must generally use the same data and digest and combine functions that were used to form the wrap key 30. Accordingly, the user must obtain (at P28) the same conditions 10 that was used to form the key 30 used to wrap the data. Typically these conditions will be supplied with the wrapped data 36 or will be made available to the user in some other manner such as on an external storage device 114 or via a network 116. Using his computer system 100, the user forms a digest 14 of the digital data representing the conditions 10 using digest function 12 (at P30) using CPU 104 or special cryptographic hardware 108. The digest of the conditions are stored temporarily in memory 106.

Similarly, if appropriate, the user must obtain (at P32) the other data 22 or the digest of the other data 26. The other data 22 or its digest 26 is provided via external storage device 114, network 116 or in some other manner. For example, the user can be provided with a printed form of the other data 22 or its digest 26 and can enter the appropriate values using keyboard 110. If the other data 22 is provided and it must be digested then a digest of the other data 26 is formed (at P34) using CPU 104 or special cryptographic hardware 108, and the digest of the other data is stored temporarily in memory 106.

The user must read the conditions 10 (at P36). The conditions can be presented to the user in a number of ways, including display on the display 112. If the user agrees to the terms stated therein, he enters the appropriate acceptance phrase 16' (at P38) using keyboard 110. A digest 20' of the acceptance phrase 16' is formed using digest function 18 (at P40) using CPU 104 or special cryptographic hardware 108, and the digest of the acceptance phrase 16' is stored temporarily in memory 106.

The digest of the acceptance phrase 20' is then combined by CPU 104 or special purpose cryptographic hardware 108, using combine function 22, with the digest of the conditions 14 and, if appropriate, the other data 22 or the digest of the other data 26, to form an unwrap key value 30' (at P42).

Since the conditions 10, the digest functions 12, 18 and 24, and the combine function 28 used to form the unwrap key value 30' are the same ones as used to form the wrap key value 30 in the wrapping phase (FIGS. 1 and 2), if the correct acceptance phrase in entered at the keyboard 110 (in P38), then the correct digest of the acceptance phrase 20' will be formed (in P40) and so the correct unwrap key value 30' (equal to key value 30) will be produced, otherwise an invalid key value will be produced and subsequent unwrapping will fail.

The wrapped data is provided (at P44), for example, on external storage device 114 or via network 116, and the unwrap key value 30' is used to unwrap the wrapped data 36 (at P46) to produce the data 32. The unwrapping is performed on computer 102 using CPU 104 or, if appropriate, cryptographic hardware 108.

The wrapped data can only be used if it is unwrapped with a cryptographic key formed from digital data representing the conditions of use of the data, optional other data and a particular assent phrase. Accordingly, the fact that the data is unwrapped means that the user must have (a) had access to the conditions, (b) had access to any other required data, and (c) entered the correct assent phrase. This does not mean that the user cannot access the unwrapped data in some other way, for example, the user can be given the unwrapped data.

As shown above (FIGS. 1–4), the wrap and unwrap keys are formed by first digesting the various components (conditions 10, acceptance phrase 16 and optionally other data 22) and then combining the digests. This approach is shown only be way of example, and other orders of digesting and combining are contemplated. For example, the various components (conditions 10, acceptance phrase 16 and optionally other data 22) can first be combined and then their combination can be digested. This latter approach may be more cryptographically secure.

The terms "assent phrase" and "acceptance phrase" are used synonymously herein to generally mean a phrase which indicates assent to and acceptance of conditions provided to the party entering the phrase.

The unwrapping process can be stand-alone or built into various user applications. For example, an application can determine that it has to access data that is wrapped. The application can then obtain the various needed data to form the key, automatically present the appropriate parts to the user, form the key from an acceptance phrase and the other data and then unwrap the data.

In the case of applications which use cryptographic keys and certificates such as are described below, the applications can use information in the certificates (extension policy 52 in FIG. 5) to obtain the policies etc. Similarly, the application can determine the unwrap algorithm from the "algorithm OID" field 46.

EXAMPLES

The application of this wrapping technique is now described with reference to various specific types of data, particularly cryptographic data used in a public key infrastructure.

The various computational processes in the following examples are performed, as above, on a computer system 100 such as that shown in FIG. 13. In order to simplify the explanation, the references to the computer system 100 and its components are omitted from the following descriptions.

In a public key infrastructure users are issued cryptographic certificates by certification authorities (CAs). A form of these certificates is described in the X.509 standard which is hereby incorporated herein by reference. FIG. 5 shows an extension of an X.509 cryptographic certificate 38 according to the present invention. Generally, cryptographic certificate 38 has various fields, including certificate number 40, the name of the issuing CA 42, the subscriber's name 44, an algorithm identifier 46, the subscriber's public key 48, an extension phrase 50, an extension policy (a policy identifier) 52, a validity period 54, other general information 56 and other cryptographic, key-related information 58. The certificate 38 is digitally signed by the issuing CA and carries the CA's signature 60.

Wrapping the Subscriber's Public Key

Figure 6A:
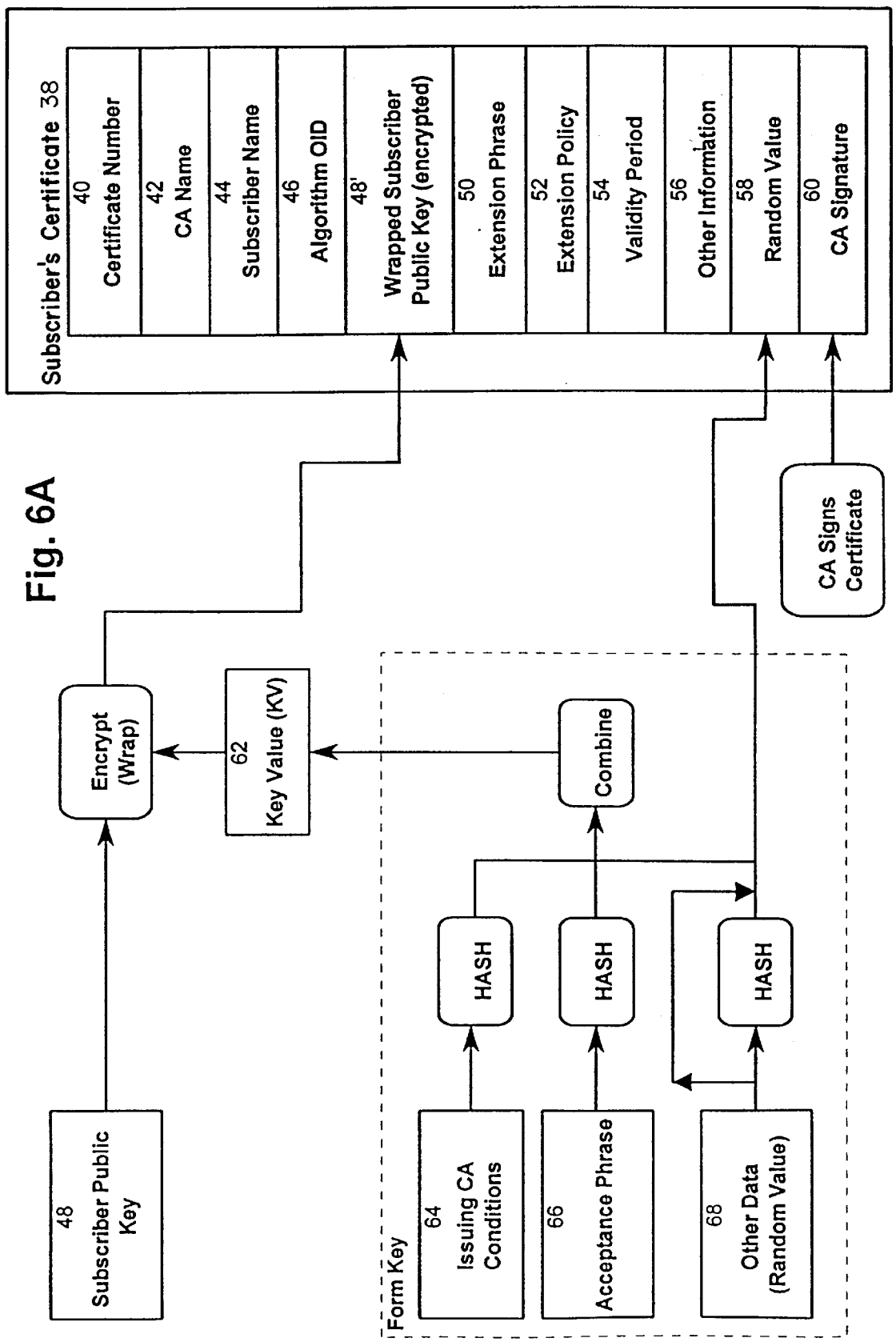
Figure 6B:
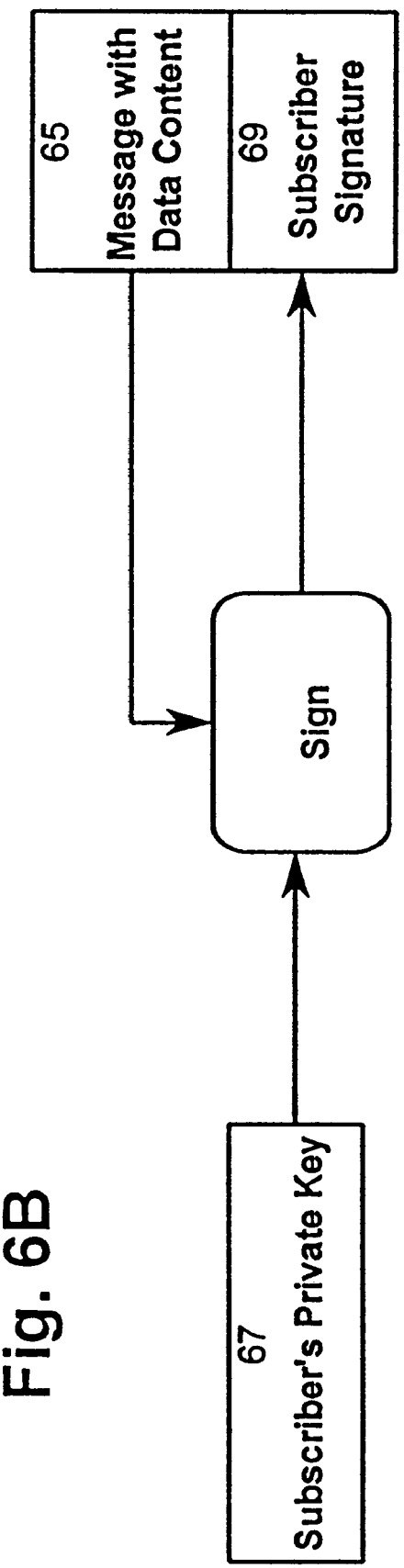

With reference to FIGS. 6A–6C, the application of this invention to wrapping a subscriber's public key in a public key infrastructure is now described. That is, the invention is applied to data which comprises a subscriber's public key in a public key infrastructure.

A subscriber in a public key infrastructure is issued a public key 48 by an issuing CA. A key value (KV) 62 is generated by combining the hashes of the issuing CA's policy statement 64, an acceptance phrase 66 and other data 68. This key value 62 is used to encrypt the subscriber's public key 48 which is then inserted (in encrypted form) 48' in the subscriber's certificate 38 which is then signed by the CA.

If other data such as random value 68 are used to form the key value 62, then the other data (or their hash) are stored in the certificate 34 as other key data 58. Instead of a random value used for the other data 68, in some embodiments a function of the certificate number 40 and the CA name 42 are used as the other data 68.

With reference to FIG. 6B, when a subscriber uses the system, he signs a message 65 with his private key 67, to produce a subscriber signature 69. The subscriber's private key 67 corresponds to the subscriber's public key 48 for use with a public key cryptographic system. In order for a recipient of the signed message to verify the subscriber's signature 69 thereon, the recipient must access the subscriber's public key 48 which is wrapped in the subscriber's certificate 38. To access the public key 48, the recipient must unwrap the key by producing the appropriate key value (KV) 62.

Accordingly, with reference to FIG. 6C, the recipient first verifies the CA's signature 60 on the certificate 38 (using the CA's public key) and then, if the CA's signature is valid, determines the key value 62 needed to unwrap the wrapped subscriber's public key 48' embedded in the subscriber's certificate 38.

To determine the key value 62, the recipient executes the appropriate unwrap algorithm, here the algorithm specified by the algorithm identifier 46 in the subscriber's certificate 38. This initiates the appropriate unwrapping algorithm which presents the recipient with the issuing CA's policy statement 64 and prompts the recipient to input an acceptance phrase 66'. A hash of the acceptance phrase 66' is then combined with a hash of the issuing CA policy statement 64 (and, if appropriate, the other key information, for example, a random value, 58 obtained from the certificate 38) to form a key value KV' 62'.

The issuing policy statement 64 can be provided separately, or identified or supplied in the extension policy field 52 of certificate 38.

If the correct acceptance phrase 66' is entered then the correct key value KV' 62' will be formed (that is, the key value KV' will equal the key value KV 62 which was used to wrap the key). Otherwise an incorrect key value KV' will be formed.

The key value KV' 62' is used to decrypt the wrapped subscriber public key 48' in the certificate 38, producing the correct value for the subscriber's public key 48 if the correct acceptance phrase 66' was input.

The unwrapped subscriber's public key 48 is then used to verify the subscriber signature 68 (which was formed with the subscriber's corresponding private key 66).

The wrapping applied to the subscriber's public key cannot be removed or the issuing CA's signature 60 on the certificate 38 will not verify.

Using the above approach, anyone using a subscriber's public key in a digital cryptographic certificate issued by a CA must assent to the conditions of the CA. The subscriber's public key is wrapped (encrypted) in the certificate with a symmetric cryptographic key formed from (a) digital data representing the CA's conditions, (b) optionally other data such as a random number, and (c) an assent phrase. Accordingly, anyone using the key must have had access to (a) the digital data representing the CA's conditions, and (b) any other required data such as a random number. Further, anyone using the public key must have also entered the appropriate assent phrase. Accordingly, this invention provides evidence that a party using a user's public key had access to certain information relating to use of that public key and indicated assent the conditions stated in that information.

The subscriber's public key 48 is signed by the CA before being wrapped.

With reference to FIGS. 6A–6D, a variation the application of this invention to wrapping a subscriber's public key in a public key infrastructure is now described.

As shown in the embodiment of FIG. 6A, a subscriber's public key 48 is wrapped and then the wrapped public key 48' is inserted in the subscriber's certificate 38. This certificate 38 is then signed by the CA to form a CA signature 60 which is appended to the certificate 38. The signed certificate is then provided to the subscriber.

Figure 6D:
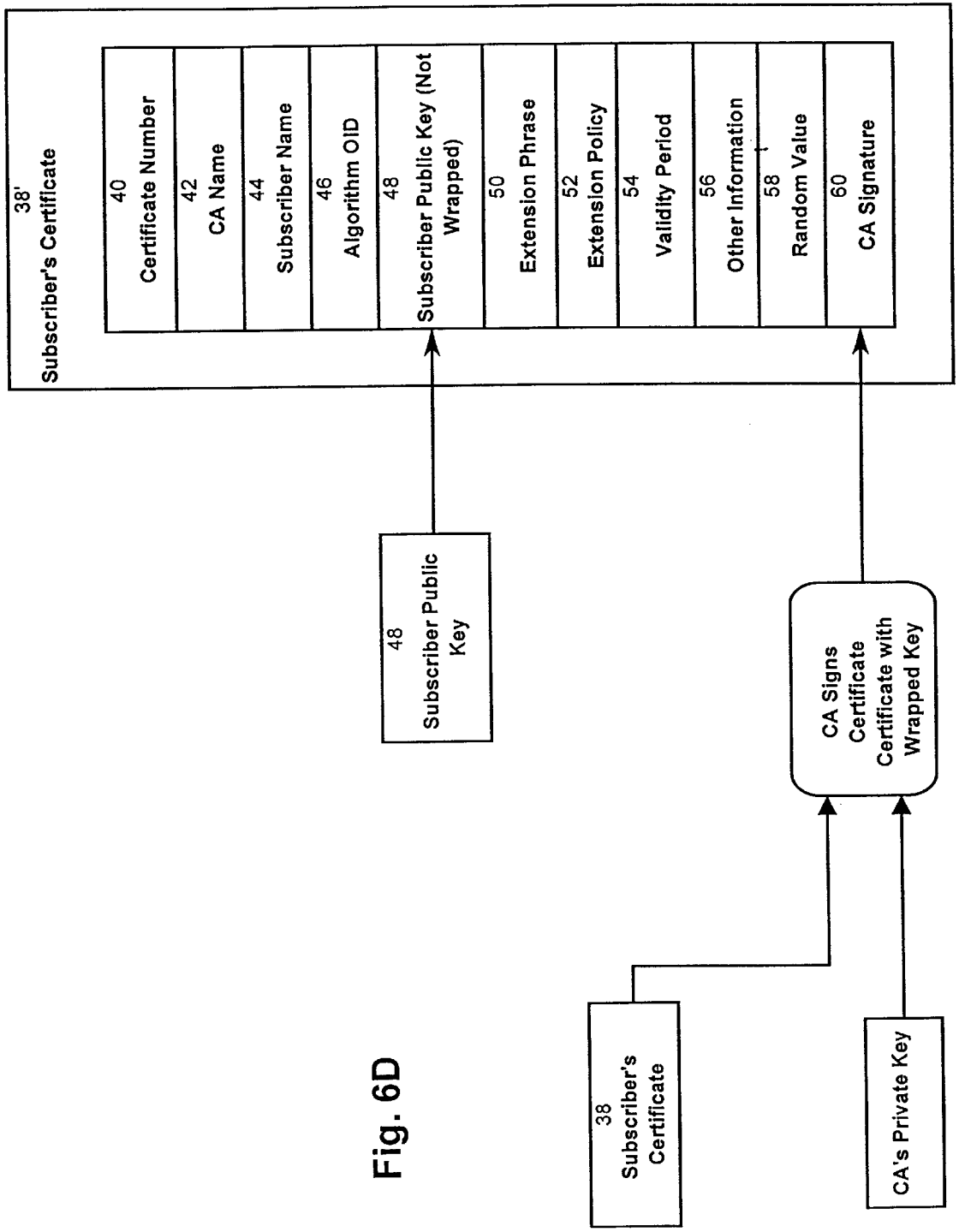
FIG. 6D shows a variation on the application of this invention to wrapping and unwrapping a subscriber's public key in a cryptographic certificate issued in a public key infrastructure.

In another embodiment, as shown in FIG. 6D, the subscriber is provided with a modified subscriber certificate 38' which includes the unwrapped subscriber's public key 48 and a CA's signature 60 formed from a certificate (as in certificate 38) having the wrapped subscriber's key 48'. That is, the signature is formed in the same way as in FIG. 6A using the CA's private key and a certificate including the wrapped subscriber's key, but then that signature is appended to a modified certificate formed with an unwrapped subscriber's key 48 instead of a wrapped subscriber's key.

In order for a relying party to verify the signature 60 attached to the modified certificate 38', he will have to form the certificate 38 by replacing, in the modified certificate 38', the unwrapped subscriber's public key 48 with the wrapped KEY 48'. In order to In order to form the wrapped key 48', the relying party will have to enter the assent phrase 66' in response to the conditions 64.

Thus, even when provided with the unwrapped subscriber's public key 48, a relying party will have to assent to the CA's conditions in order to verify the certificate.

Formation of the modified certificate 38' is as follows: First, a wrap key value (KV) is formed as described above with reference to FIG. 6A. This wrap key (KV) is used to wrap the subscriber's public key and the wrapped public key is inserted into a subscriber's certificate 38. The CA then forms a signature S using the CA's private key and the subscriber's certificate 38. The CA also forms another subscriber certificate 38' with the subscriber's public key (not wrapped) inserted therein instead of the wrapped subscriber's key. The certificate 38' then has the signature S appended thereto.

In order to rely on information in the subscriber's certificate 38, a relying party must verify the signature S on the certificate. To verify the certificate's signature, the relying party must create the certificate which was used to form the signature. That is, the relying party must replace the unwrapped subscriber's public key 48 with the wrapped version of that key 48'. Therefore, in order to verify the signature S, the relying party must form the wrap key and wrap the subscriber's public key. To form the wrap key, the subscriber must use the same conditions, assent phrase and other data as was used by the CA to form the same key.

In another variation on this embodiment, the CA can form a signature 60' on the modified certificate 38' and then provide the user with a certificate containing the wrapped subscriber's key 48' and the signature 60' formed from a certificate with the unwrapped key. In this case, in order to verify the certificate, a relying party will have to form a new certificate formed by replacing the unwrapped key by the wrapped key.

In yet another variation on the embodiment, there are two wrapping keys, one given in the certificate and the other signed. In general, the idea is to unwrap and re-wrap differently. Thus, the CA can form a signature on the modified certificate and then provide the user with a certificate containing a subscriber's key wrapped in one way (using a first string or phrase, that is, with a first wrap key) and a signature formed from a signature with a second wrap key formed using a different string or phrase from the first string. In this case, in order to verify the certificate, a relying party will have to form a new certificate formed by unwrapping the key (formed with the first string) and wrapping it in the second way (using the second string) and replacing the first wrapped key (formed using the first string) with the second wrapped key formed using the second string.

Wrapping the CA's signature on a certificate

Figure 7A:
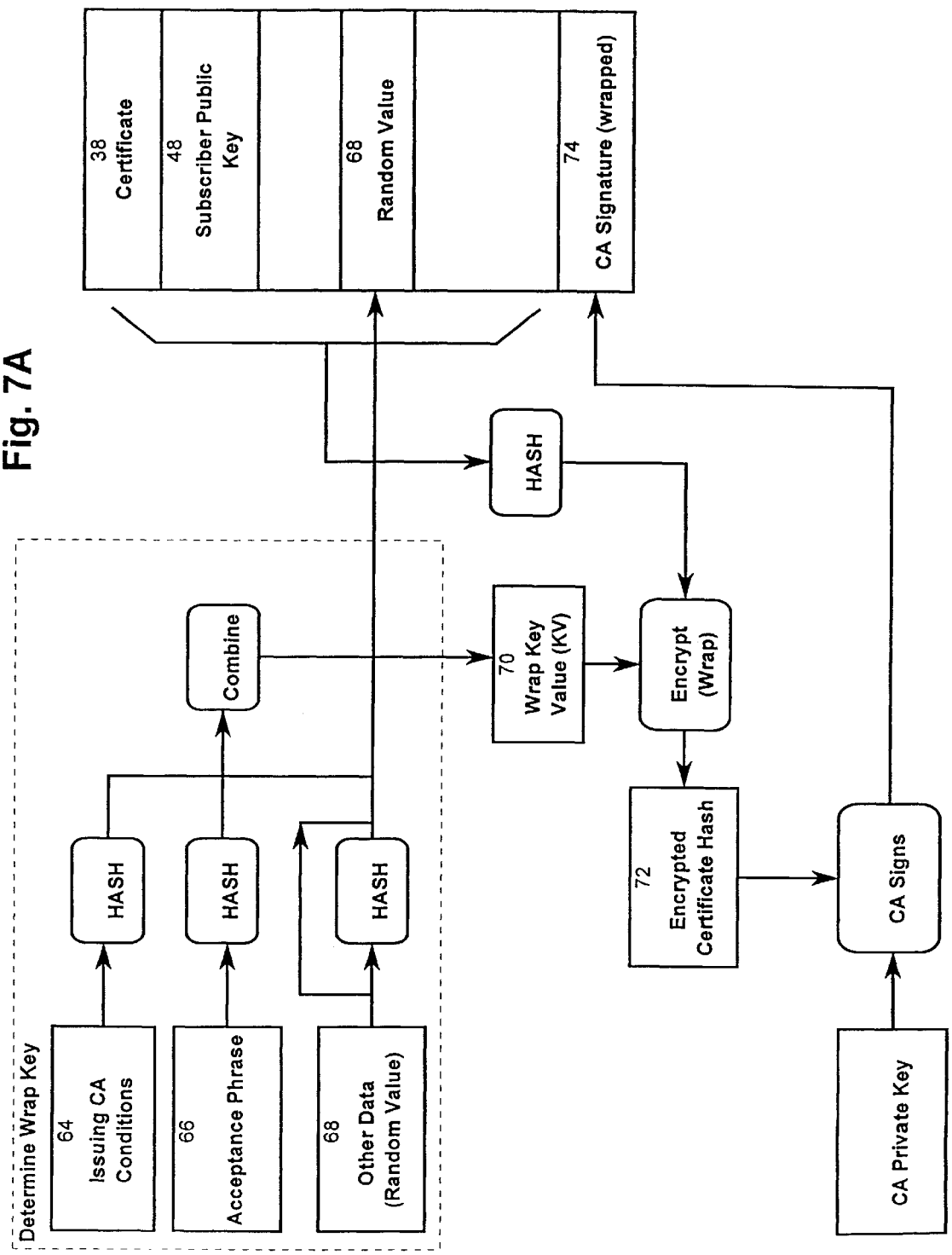
FIGS. 7A–7B show the application of this invention to wrapping and unwrapping a certification authority's signature on a subscriber's certificate in a public key infrastructure.
Figure 7B:
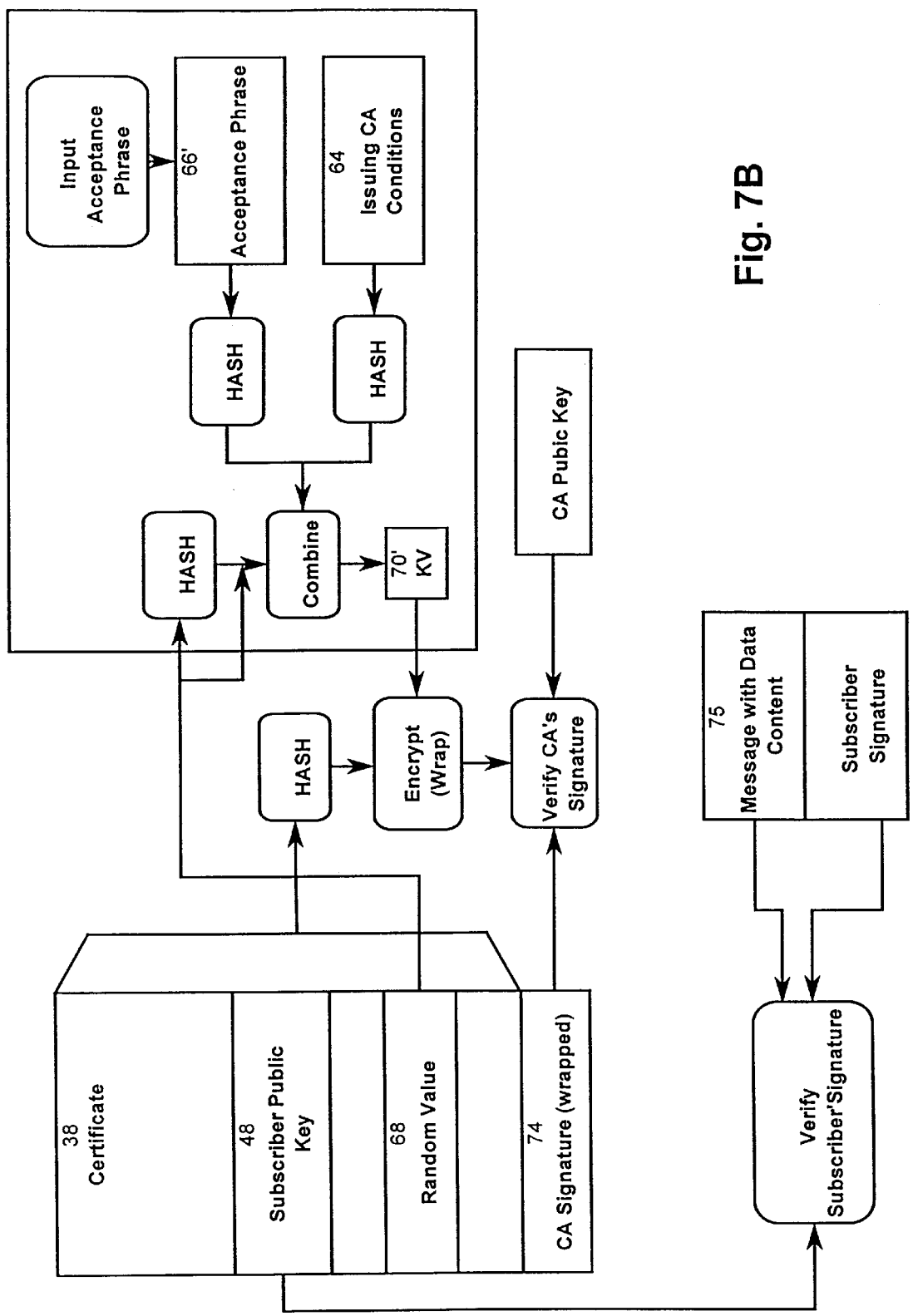

As noted above, when a CA in a public key infrastructure issues a certificate to a subscriber, the CA signs the certificate. In another embodiment, as shown in FIGS. 7A and 7B, the invention is used to wrap the issuing CA's signature on a certificate.

First, a CA issues a digital certificate 38 containing, for example, a subscriber's public key 48.

A wrap key value 70 is formed using the combined hashes of the issuing CA's policy statement 64, an acceptance phrase 66, and, optionally, other data 68 such as a random value.

If other data 68 is used to form the key value KV 70, then the other data 68 are stored in the certificate 38.

The contents of the certificate 38 are hashed and the hash of the certificate is encrypted using the wrap key value 70 to form an encrypted (wrapped) certificate hash 72. The issuing CA digitally signs this encrypted certificate hash 72 using its private key to form a wrapped CA signature 74 which is appended to the certificate 38.

When a recipient of a signed subscriber message (64, 66, formed as per the process of FIG. 6B) wishes to verify the subscriber's signature 66 on the message, the recipient must obtain the subscriber's public key 48 from the certificate 38. However, before relying on the subscriber's public key 48, the recipient must first verify the certificate 38 itself. That is, the recipient must first verify that the CA issued (and signed)

the certificate 38. To do this, the recipient must verify the CA's wrapped signature 74 on the certificate 38.

First the recipient must determine the appropriate key value 70' which will unwrap the wrapped CA signature 74. Accordingly, the recipient is presented with the issuing CA's policy statement 64, and responds thereto with an acceptance phrase 66'. Hashes of the acceptance phrase 66', the policy statement 64 and, if required, the random value (or other information) 68 are combined to form a key value KV' 70'.

If the correct acceptance phrase 66' is input then the correct key value KV' (equal to KV) will be formed, otherwise an incorrect key value will be formed.

The contents of the certificate (excluding the wrapped CA signature 74) are then hashed and wrapped (encrypted) with the key value KV' 70'. Then the CA's signature is verified using this hash and the CA's wrapped signature 74. The appropriate signature verification is done, depending on the type of encryption used.

For example, in the case of an RSA signature, the wrapped CA signature 74 is decrypted with the CA's public key. The decrypted CA signature 74 should be equal to the hash of the certificate encrypted with KV'. If it is not equal then the CA's signature is invalid, otherwise it is valid.

The CA's signature is cryptographically wrapped using a key formed from (a) conditions of the issuing CA, (b) optional other data such as a random value and (c) a particular acceptance phrase. Accordingly, if the signature is unwrapped then the party doing the unwrapping must have had available (a) the conditions of the issuing CA, and (b) any required optional other data such as a random value. Further, the party must have entered the required particular acceptance phrase. Accordingly, this invention provides evidence that a party which verified a CA's signature had access to certain information relating to use of the signature and indicated assent the conditions stated in that information.

Wrapping the Subscriber's Signature on a Message

The wrapping can be applied by a subscriber to a public key infrastructure to his own signature such that a recipient (relying party) will be obligated to perform the assenting function of this invention in order to verify the subscriber's signature.

Figure 8A:
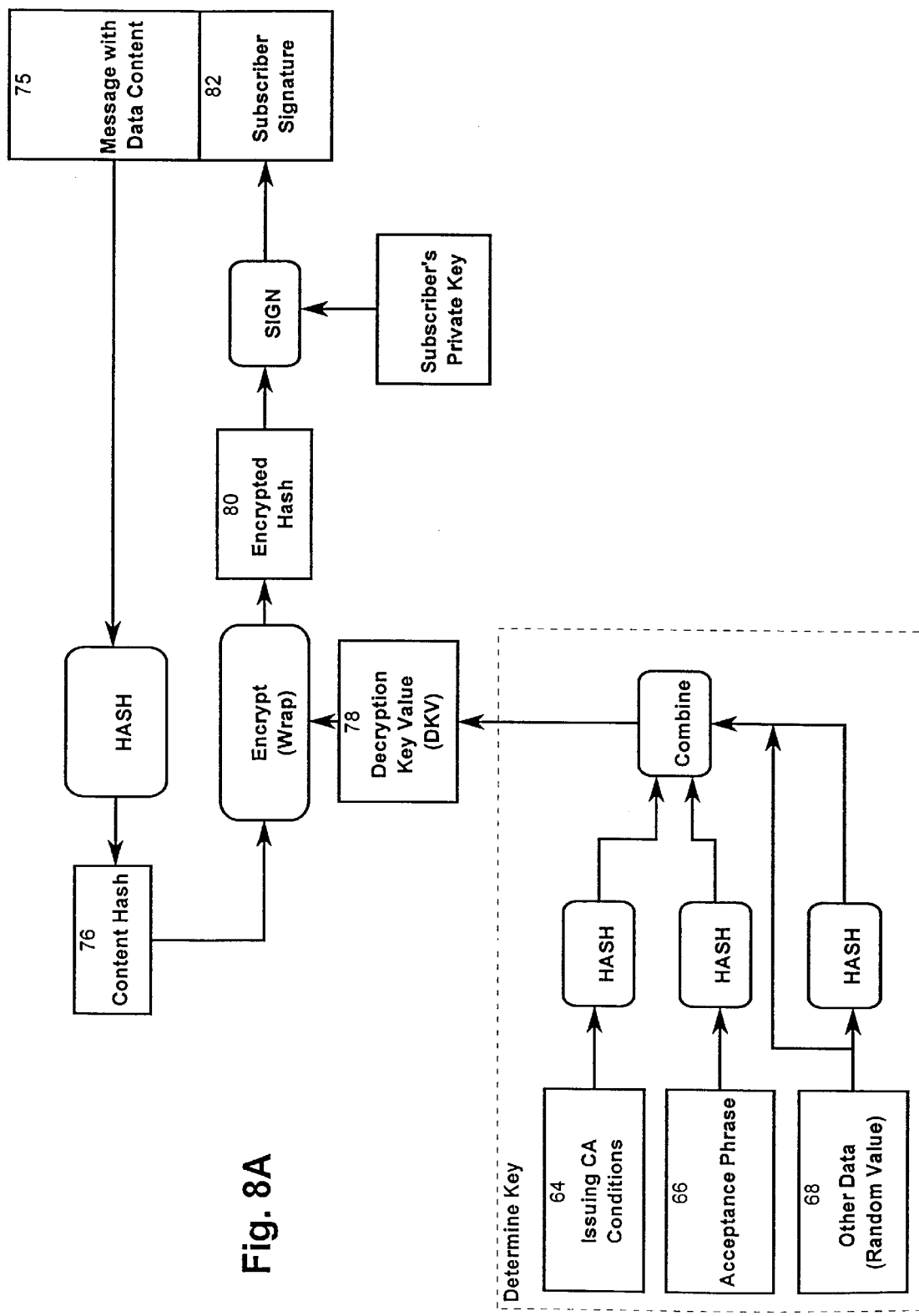
FIGS. 8A–8B show the application of this invention to wrapping and unwrapping a subscriber's signature on a message in a public key infrastructure.
Figure 8B:
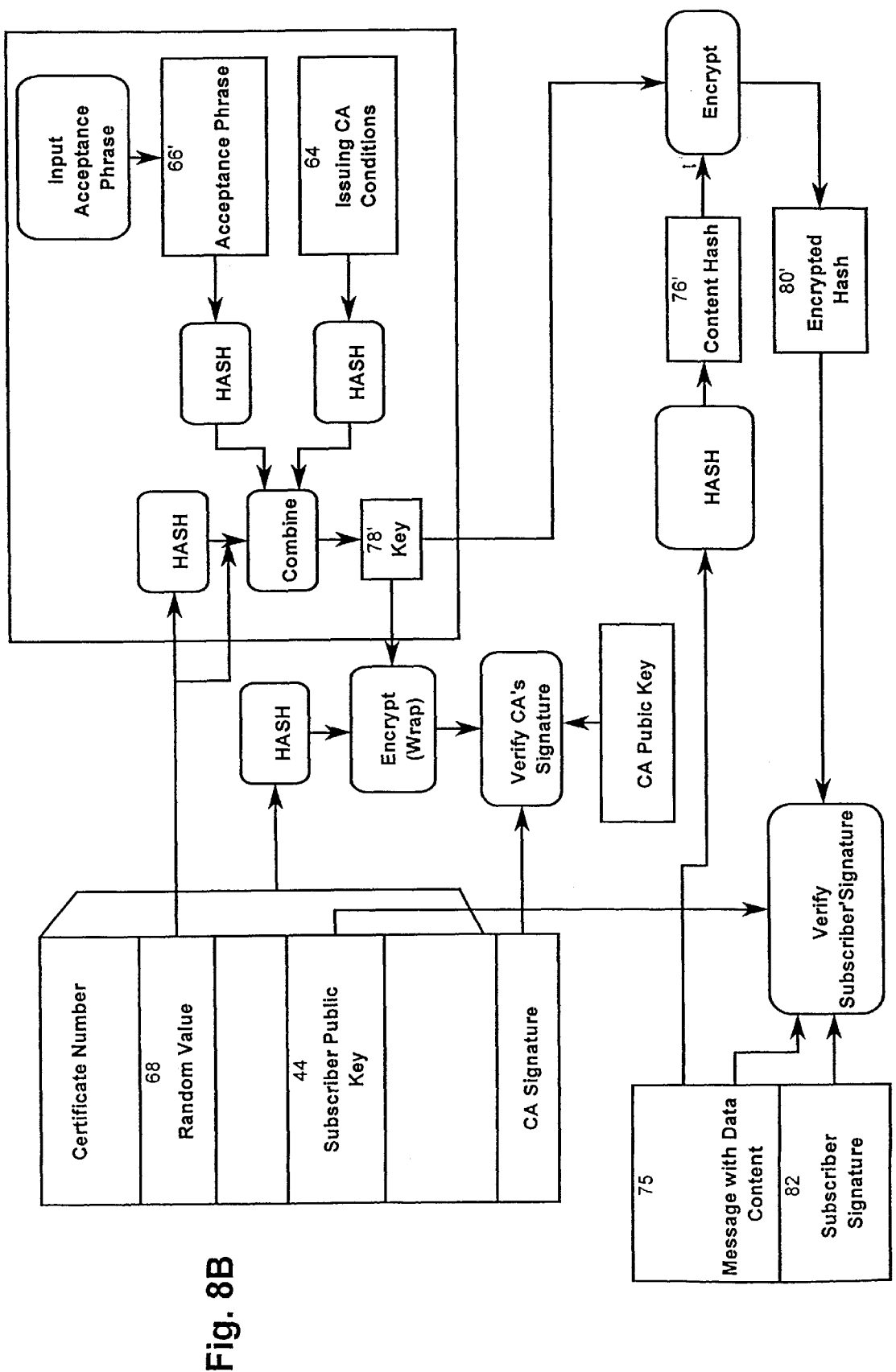

With reference to FIG. 8A, which shows a system wherein the CA's signature is wrapped (as shown above with reference to FIGS. 7A and 7B), a subscriber signs his message 75 as follows. The message content 75 is hashed to produce a content hash 76. This content hash is encrypted with a key value KV 78 formed as usual from the hashes of an issuing CA policy statement 64, an assent or acceptance phrase 66 and, optionally, other data 68 such as a random value. As shown, the policy statement 64 and the other data 68 used to form the key value KV 78 are the same as were used to form the key value KV 70 used to wrap the CA signature (FIG. 7A). However, different policy statements and random values can be used, giving different key values.

In any case, the thus encrypted content hash 80 is digitally signed using the subscriber's private key to form the subscriber's signature 82.

A recipient of a message 64 signed by a subscriber must verify the subscriber's signature 82 in order to rely on that signature.

Accordingly, upon receipt of a message 75 produced as described above with reference to FIG. 8A, the recipient performs the following:

A key value KV' 78' is formed from the combination of the hashes of the issuing CA's policy statement 64, an input assent or acceptance phrase 66' and, if necessary, other data 68 (such as random data).

The key value KV' 78' is used to verify the wrapped CA signature (as shown above).

Also, the message content 64 is hashed and the content hash 76' is encrypted using the key value KV' 78' to produce encrypted hash 80'. The value of the subscriber's signature 82 is decrypted with the subscriber's public key 44 obtained from the subscriber's certificate. If the encrypted hash 80' is the same as the decrypted subscriber signature 82 then the signature is valid, otherwise it is invalid. The appropriate verification technique is used, depending on the signature algorithm used.

The above examples have been described, for the sake of simplicity, using a particular order of key formation using a single language, however, any order of key formation, including in parallel, can be used.

Further, the above examples have been described, for the sake of simplicity, using wrapping for a particular value in the certificates. The various examples can be used alone, as described, or in combination. For example, in the same system, the CA may wrap its signature and the subscriber's key and the subscriber may wrap his signature.

In the above examples, the other data used to form the wrap and unwrap keys can also include the public key of the intended recipient.

Figure 9:
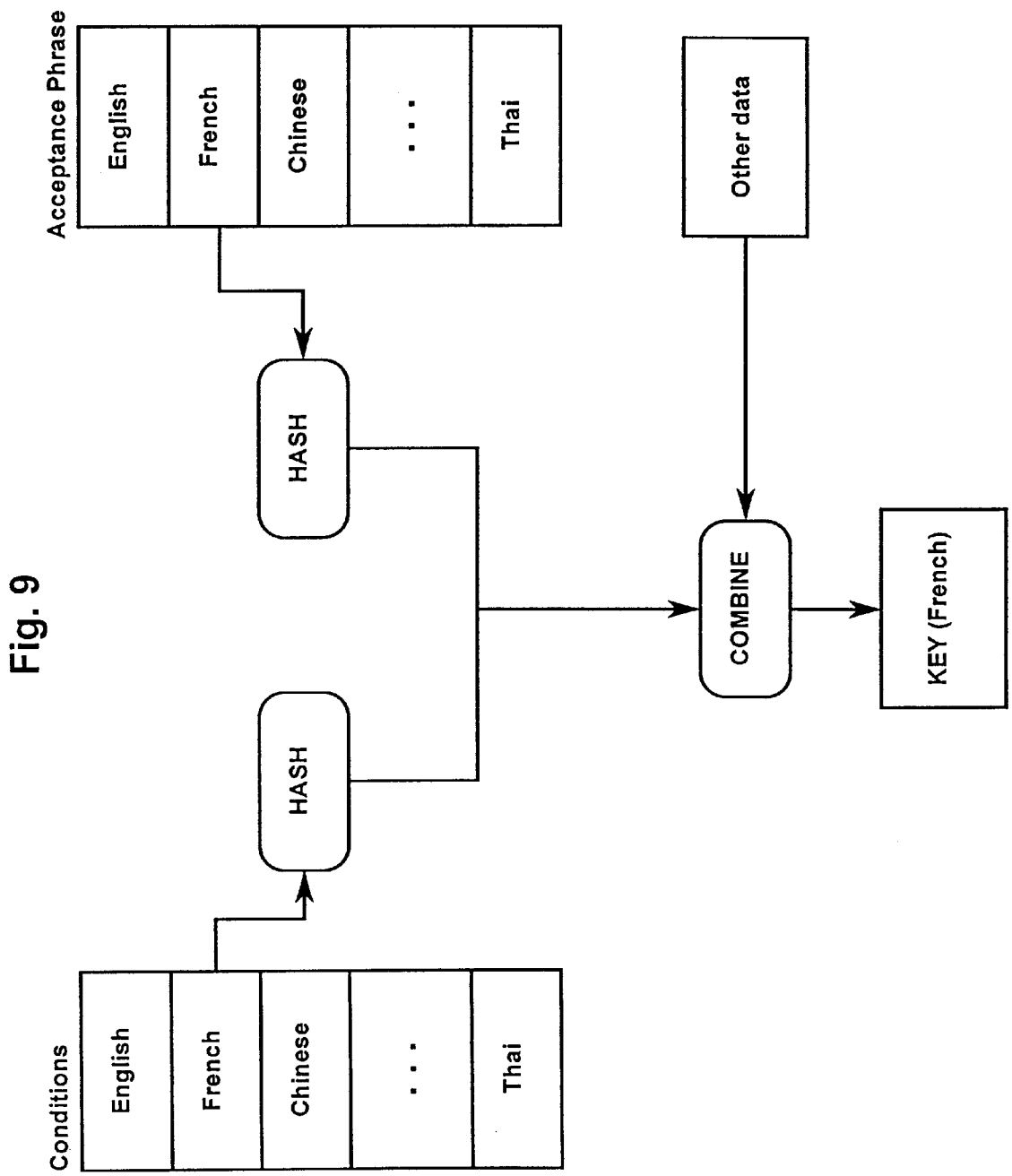
FIGS. 9–12 show multi-language key formation according to the present invention.

Still further, as shown below with reference to FIGS. 9 and 10, conditions and assent or acceptance phrases in other languages can also be applied.

This invention is language independent, although, in general, the same language should be used to form the wrap and unwrap keys. Since the unwrap key is formed from an assent phrase, in order to be able to distribute data to people speaking different languages, the system is able to use assent phrases in different languages. In general, as shown in FIG. 9, the system operates by selecting a number of languages, producing conditions in each language, along with an assent phrase for each language and then determining a wrap key based on that assent phrase and conditions.

Figure 10:
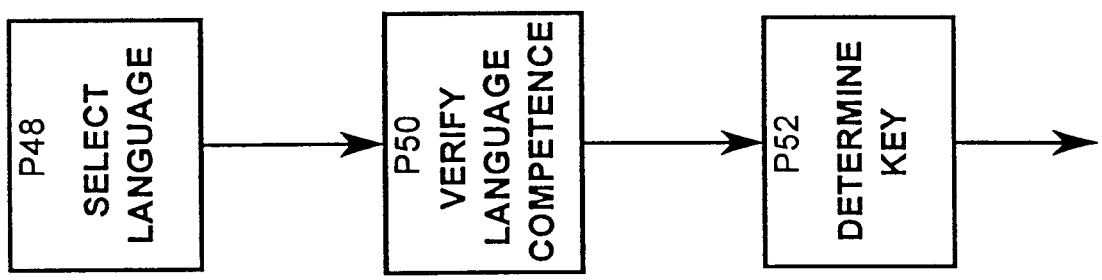

In order to produce the unwrap key, as shown in FIG. 10, a user must select the language used to generate the wrap key (at P48), verify competence in the selected language (at P50) and then determine the key for that language (at P52).

It is also possible to create a system that is language independent. That is, the wrapping and unwrapping need not be performed in the same language. This result is achieved by generating a wrap key and an unwrap key that is universal for all languages. An embodiment of such a system is shown in FIGS. 11 and 12.

Figure 11:
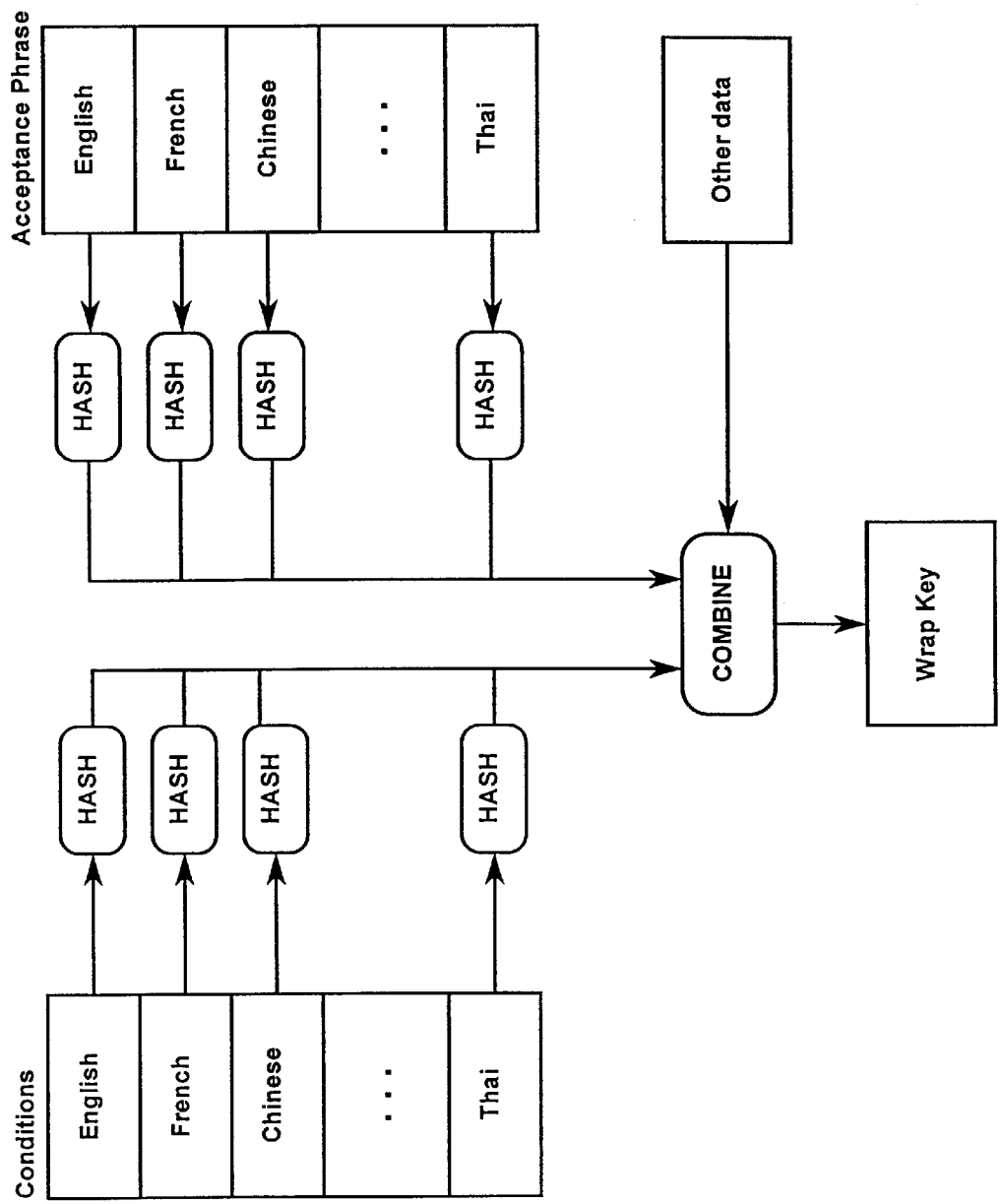

As shown in FIG. 11, the wrap key is formed from the combination of the hashes of the conditions in all languages and the hashes of the acceptance phrases in all languages. Once a particular language is selected, the unwrap key can be formed from the hashes of the conditions and the acceptance phrases in all non-selected languages, along with the hash of the policy and the acceptance phrase in the selected language.

Figure 12:
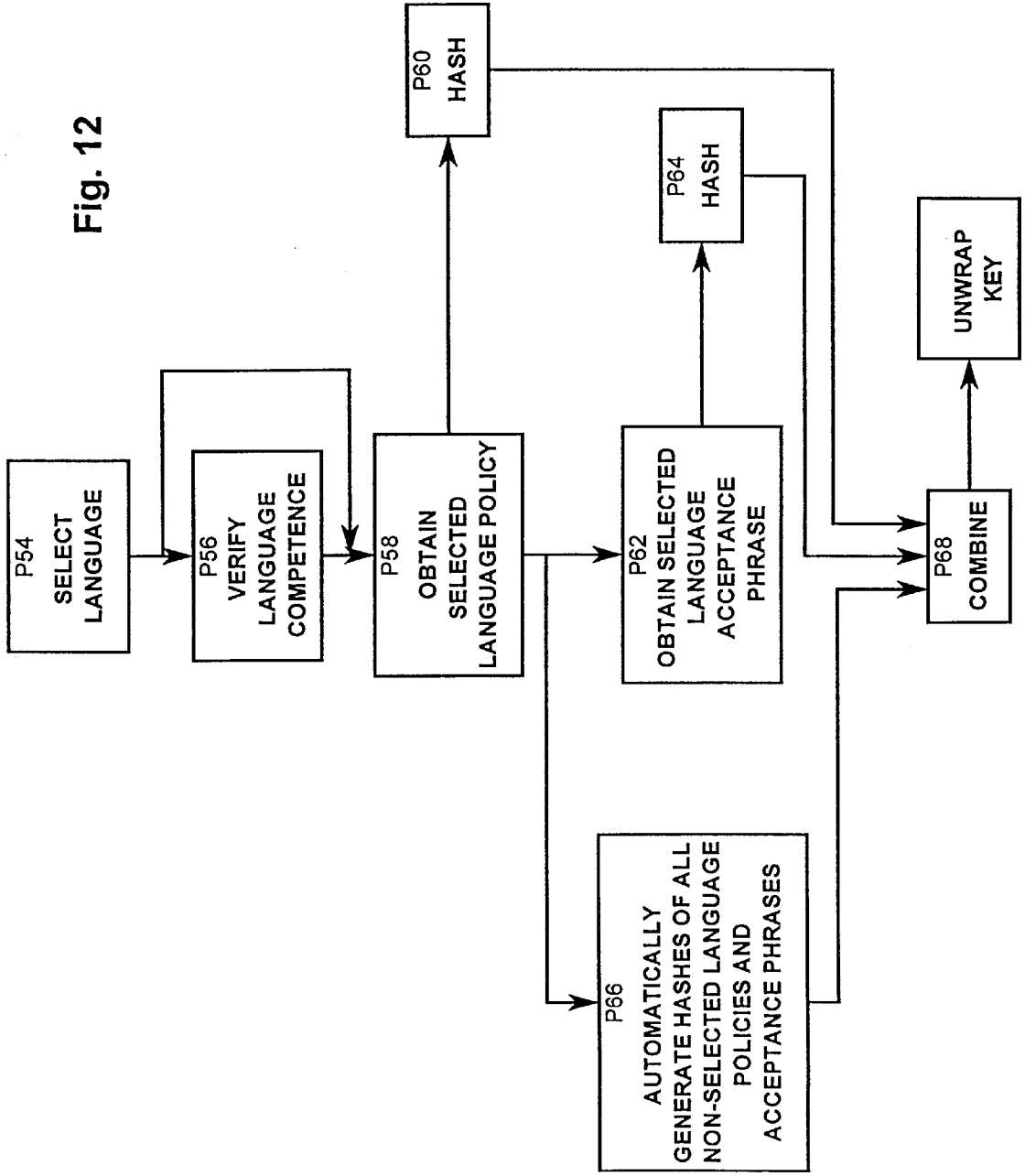

As shown in FIG. 12, the unwrap key is formed as follows: first a particular language is selected (at P54) and competence in that language is verified (at P56). The competence check (at P56) can be very simple and rudimentary and can consist of asking a number of very simple questions in that language and checking the answers. In some embodiments the competence check can be omitted.

Next the conditions for the selected language are obtained (at P58) and hashed (at P60). The conditions are provided to the user who enters the appropriate assent phrase (at P62) which is hashed (at P64). The hashes of all non-selected language conditions and phrases are automatically generated and hashed (at P66) and are combined (at P68) to form the unwrap key.

In the field of computer security auditing, proof of the integrity and authenticity of data has traditionally depended on being able to prove a chain of custody of data from the point of origin/input and authentication (approval of contents) of that data to the point of viewing, reporting, use, or reliance on that data.

A distributed environment is said to exist (in the field of computer data security) when data is moved from one computer to another, and where the two computers are not under the custody and control of the same legal entity. In such a distributed environment, the chain of custody approach becomes prohibitively costly. It is rare to transport the data between computers using bonded couriers or over secure networks, and it is difficult and expensive for a recipient of data to maintain adequate reliable evidence of the chain of custody that existed up until delivery into its own computer system, and afterwards until the time of use and reliance.

When many computers under disparate ownership are linked together using insecure public networks, it becomes extremely difficult (if not entirely impracticable) to prove chain of custody as the predicate of authenticity.

In these situations, as a general matter, the use of digital signatures (and digital public key certificates to verify them) provides a superior method for proving the physical integrity and authenticity of such data or records on distributed computer systems. This is because the ability to prove a message's integrity and authenticity is inherent in the digitally signed message itself and does not depend on or require proof of chain of custody, prior to reliance by the recipient.

It is a significant consequence of the above that in a distributed environment, any action or physical relationship that associates one element of representation of data with another element of representation is assumed to produce a strong binding only if done within the secure confines of a single computer owned by a single legal entity. Hence, unsigned data received from external sources (in the absence auditable and costly physical transport methods) is assumed to have greatly decreased weight for evidentiary purposes, as to their inherent authenticity and integrity.

Indeed, it is routine for unsigned data to be altered accidentally or intentionally, and for computer programs to be altered by infection with computer viruses. In such cases the data, while resembling the original, now lack authenticity and integrity.

In the case of unsigned data relating to a second party, that has been received from unrelated third parties, the recipient has a relatively weak right to rely on the accuracy and authenticity of such data, and no right to rely on any assertions that might have been made about such data, assuming that the recipient never received a copy of such data signed by the party sought to be held responsible, or if he did receive such a copy, he did not in fact verify the signature and determine for himself that the signature was associated with the data representation on which he sought to rely.

As follows from the foregoing, the recipient cannot maintain a legal claim of reliance on an erroneous or false data representation, even against one who had signed a different copy of the data, if he did not verify the signature of the signer and actually rely on the signature and the data which was signed. For if he does not, then there is a substantial likelihood that the data may have been altered as noted above, and even if they are not, reliance on such data may be inherently unreasonable in the absence of a good chain of custody from the party sought to be held responsible.

This invention provides a strong, non-evadable, non-removable method for intervening in the signature verification process to interpose a requirement of provable objective manifestation of assent to a set of terms and conditions as a predicate to reliance on the signature of one who signed the data, intending to make some legal assertion about it, but further wishing to condition the recipient's ability to rely on that assertion upon the acceptance by the recipient of certain terms and conditions.

Typical provisions of such terms and conditions include (a) that the recipient can only sue the signer in a particular legal jurisdiction, for example, under United States law and can only bring suit in a particular state or city, for example, New York City, and (b) that in no event will the signer's liability exceed certain limits, for example, $100 for one transaction and $500 for any series of related transactions, etc.

If a recipient performs the processing required by the invention to form the phrase indicating assent to the terms and conditions, combines that phrase together with a digest of the terms and conditions themselves to form a key needed to unwrap the digital data on which he seeks to rely, and in fact unwraps the digital data—within the secure boundaries of a single computer system under the control of a single legal entity—and then in fact relies on the representations made by the data in conjunction with the signature and other assertions made by the signer, then in the event that he reasonably relies on such data, and due to some error or fault of the signer suffers a loss, then he becomes entitled to maintain a legal action against such signer, in regard to such loss, in accordance with the terms and conditions of the signer to which he has manifested assent.

If on the other hand, he merely receives the wrapped data as signed by the signer, but also receives an unwrapped copy of such data, and does not perform the specified acts of verifying the signer's signature over the wrapped data, objectively manifesting assent to the terms and conditions, unwrapping the data, and relying on the data as unwrapped—and instead he merely sets aside the wrapped data and uses and relies upon the unwrapped data which was received in an already unwrapped state from some other third party, without chain of custody from the signer/originator, and without manifesting assent to the conditions, as provided in this invention, and the wrapped data was signed over by the originator of that data (program, certificate, field of a certificate, etc.)—then the user may not legally rely on the signature of the sender/originator as a guarantee of authenticity, accuracy, or legal liability in regard to the digital product, because that originator's signature exists and is verifiable only in regard to the wrapped product.

The present invention is therefore of great utility in the case of wrapping a public key of a subscriber within a public key certificate signed by a certifying authority. The recipient may rely on the authenticity and integrity of the subscriber's public key only after he has performed the act of unwrapping the public key. But since the unwrapped public key is not signed by the CA, such an act of reliance can only be reasonable when performed within the secure boundaries of a computer system owned and controlled by a single legal entity. Although the key may be easily received in clear form from another entity who had unwrapped it on their computer, this unwrapped key is unsigned, and hence carries no assurances of authenticity, integrity, and liability for mistaken assertions. At most, the recipient of the unsigned key, if he suffers a loss as a result of a mistaken assertion regarding the key, might maintain a lawsuit against the entity that had supplied the unwrapped key, providing he can prove an auditable chain of custody as to them. But he cannot claim to have relied on any assertion made by the CA that signed the certificate.

As a consequence of the foregoing, the wrap applied to a data object signed over by a signer may be considered non-removable, since the value of the signature as an assurance of authenticity and integrity is lost when the unwrapped data are transported over insecure networks between computers under disparate ownership and control. Reliance on such data which the user has not unwrapped himself is extremely risky and implausible as a basis for commercial reliance.

As noted, in the case of a wrapped public key within a certificate, or other data which are signed over by an originator, the wrapping becomes integral to the signed data message and cannot be removed by the end users without forfeiting the right to rely on the originator's signature.

The application of this wrapping technique is now described with reference to another type of exemplary data, particularly digitally watermarked data.

There is a rapidly developing body of art concerning so-called digital "watermarking" which attempts to introduce a unique concealed data value within digital goods, to allow detection of the source of illegal copying.

Under a watermarking approach, a digital data file is altered in some substantially undetectable way to embed a numerical or other unique identifying value (herein "glyph") within the data. Then the data can be delivered by a seller to a known end user under a license that prohibits copying and redistribution. The seller records the buyer's identity (name) as well as the glyph value. If illegal copies of the digital goods (say a digitized movie) are found freely available, for example, on the Internet, then the seller can examine the retrieved goods, look for the glyph value, look up that value in its database, and thus find the name of the user that purchased a license for that instance of data content. The seller is thereby able to initiate an investigation against that end user for potential illegal copying.

The term glyph refers to any type of unusual pictorial representation of digital data, such as a fine crosshatch background pattern, where the cross hatches are in fact little bars that point in different directions, symbolizing binary 1's and 0's, thereby forming a concealed numerical or data value. The concealed value may also be the result of kerning various letters slightly differently in a PostScript file, or embedding meaningful bit values in the least significant registers of pixels in photographs or other images. This latter technique is generally known as steganography, and can be used to hide any type of data in a photograph, since the least significant bits generally have very little impact on the appearance of the photograph.

A good watermark or glyph is difficult to detect, alter, remove, or make illegible. In the case of bits in pixels, for example, it is possible to use just a few pixels (say a dozen or so), position them anywhere in the photograph, and select them in any order to form the concealed data value. This can be an advantage when trying to hide secret cryptographic data (such as a key value) inside a photograph.

In the case of software, there are other ways to embed a unique concealed data value within the delivered content. For example, a serial number might be written in several places and also have it scattered around in places that are difficult to find. Error correction technologies may also be used so that if some elements of the data value are obliterated or changed, the remaining elements can still be taken together to compute the original watermark value.

It is assumed that the end result of watermarking will be a unique concealed data value (a glyph) embedded within the data content that can be later used to trace goods back to the party to whom the goods were originally distributed.

There is a general belief that emerging global networks such as the Internet are ungovernable from intellectual property and tax standpoints. This invention, however, has the power to impose contractual conditions on any end user, anywhere in the world. This can potentially help alter the balance of legal rights back in favor of intellectual property owners by making it easier to impose and enforce licenses, especially those containing clauses forbidding copying of licensed data content.

The basic approach to wrapping data that contains glyphs is that during the computation of the unwrap key, in addition to requiring a digest of the terms and conditions, a digest of an assent phrase (such as "I Agree" in some language), and a random value, in addition to (or in lieu of) the random value, we would also require the end user to include a data value based on some function of the concealed glyph value that is as yet embedded inside the wrapped digital data. This strengthens the legal rights enforcement case, by provably linking the user's assent with the concealed glyph value, thereby proving the user's assent to the terms of the license (including the illegal copying provisions) as to a specifically tagged piece of data content.

Figure 14:
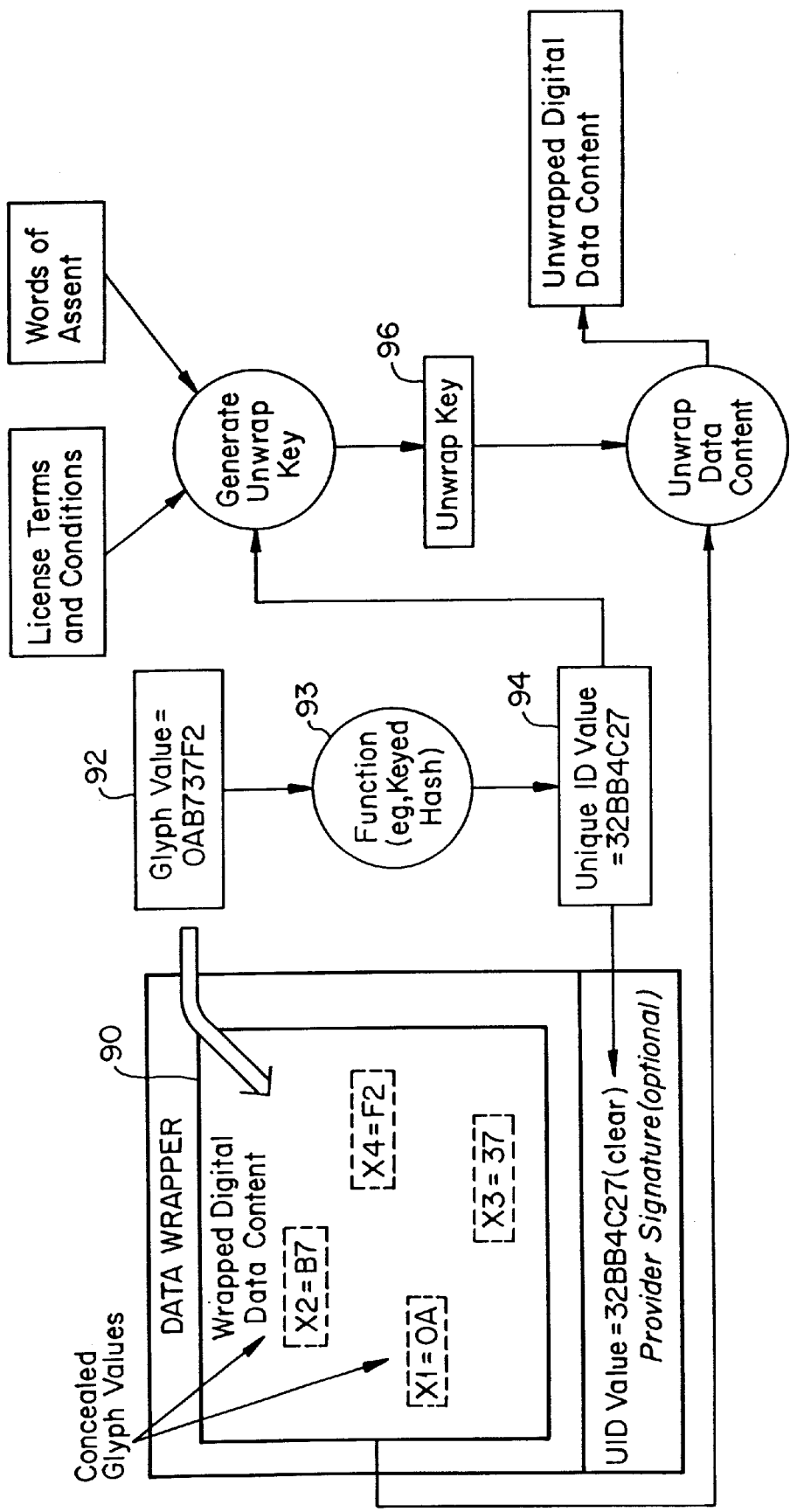
FIG. 14 shows the application of this invention to wrapping and unwrapping of watermarked digital data.

With reference to FIG. 14, a provider of licensed data 90 generates and embeds a unique glyph value 92 with every licensed copy of that data 90. The provider derives a unique identifier (UID) value 94 as a function 93 of the glyph value 92, and then includes the UID 94 in computing the wrap/unwrap key 96. At the time of delivery of the licensed data 90, the provider records the identity of the end user in a database, along with at least the UID value 94 of the marked digital goods, to enable later identification of the licensee, for example, in case the goods are found to have been improperly redistributed.

In case it is feared that knowledge of the UID 94 might confer undesirable knowledge of the glyph value 92, such as might lead to its discovery and removal from the content, the function 93 used to derive the UID 94, instead of being a public hash function such as MD5, might instead be a keyed hash function, where the key remains known only to the content provider, until it is necessary to prove the linkage.

As long as the glyph value 92 can be known at the start of the process, this process can be applied to delivery of stream data, where the initial part of the data is being received and unwrapped by the end user while later parts of the data are still being generated and wrapped by the content provider. In that case, the information necessary to form the unwrap key 96 would need to be provided at the beginning of the data stream transmission. The provider could then use the wrap key to continue wrapping later portions of the stream, while also continuing to embed elements of the glyph value in the data content along the way, possibly in a repetitive or varying manner.

The approach also works for non-concealed values such as a product serial number, as long as there is some way to associate that serial number with a given copy of the product. In an alternative embodiment, the UID could be merely a hash of the message, but that would not provide as strong a linkage as a concealed glyph value, since the user can negate the association between the hash and the data content by making a very slight alteration to the data content.

When recording the glyph value, UID, and buyer identification in the database, the seller may protect the integrity of those database entries by a method of hash chaining, such as by including a hash of the previous database record in the current one, and then including a hash of the current record in the next record, and so on, as is known in the prior art. Such a method makes it difficult to alter prior entries without detection, thereby helping to strengthen the seller's legal proof that the goods containing the glyph value were delivered to the buyer.

Figure 1:
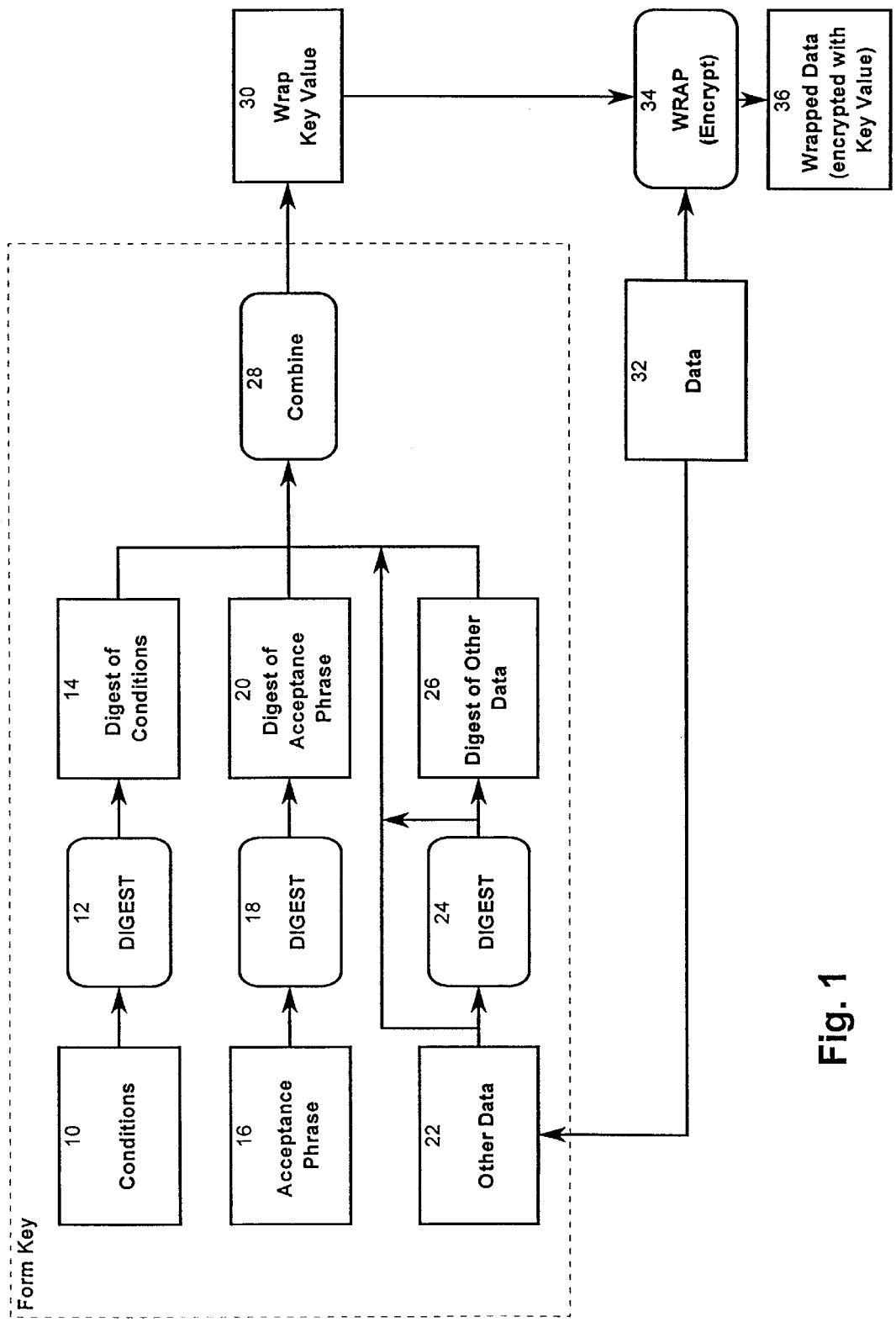
FIGS. 1 and 2 show the general data wrapping according to the present invention.
Figure 2:
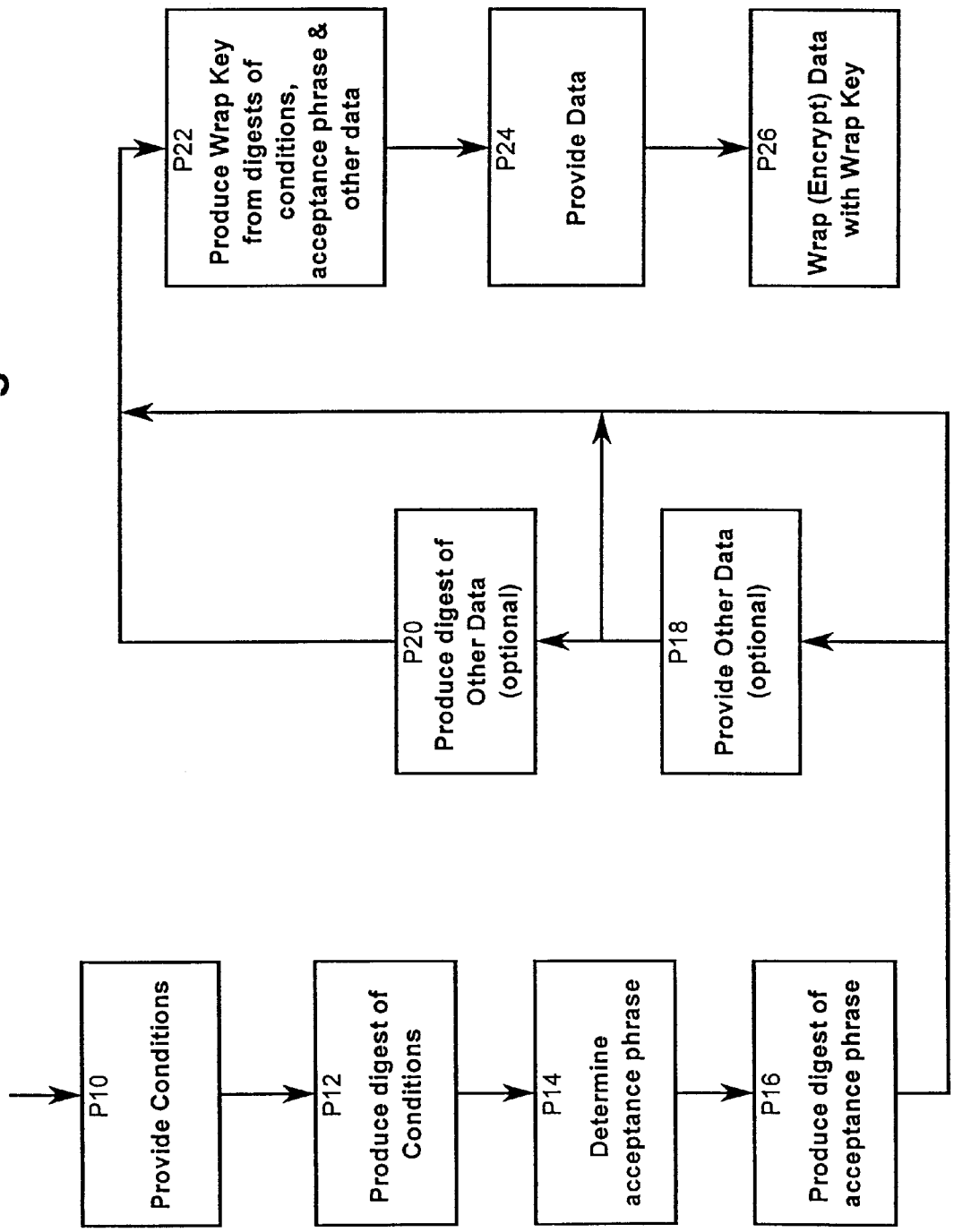

Thus, with reference to FIGS. 1 and 3, data 32 can be watermarked digital data or digital data with a glyph, and the watermark or glyph is used as part of the other data 22 when forming the wrap key value 30 (or unwrap key value 30').

The digital certificate, signature, or other message which contains a wrapped field or component may contain a reference identifier or locator to assist the recipient in obtaining the required terms and conditions document. This may be a well known code name for the document (for example, "The XYZ System Rules"), or a network retrieval address, for example, a uniform resource locator (URL), such as, for example:

"www.xyz.com/conditions/english/rules_v422.html" that can enable the recipient to easily retrieve, review, and process the document according to this invention.

The terms and conditions document and acceptance phrase can be in any language, and some documents may be translated versions of others. Where a relying party wishes to signify assent to the terms and conditions using one of the translated documents, the resulting unwrap key must be translated back to the original one used to wrap the wrapped digital data. This can be done by looking up or retrieving a translation string, which may be a string of bits that, when XOR-ed with the key obtained from the user's assent to the conditions, yields the original unwrap key. This translation string may be obtained from a table of such strings stored within the user's software, or retrieved from a central repository along with the translated version of the terms and conditions document. The function by which the user's derived unwrap key is translated to the original unwrap key using the translation string can be other than the XOR function. For example, the user's derived unwrap key might first be encrypted via a symmetric algorithm, such as DES, using some portion of the translation string as a DES key, and then have the result XOR-ed using some other portion of the translation string to yield the required unwrap key.

As a matter of legal evidence, the additional translating of the unwrap key does not materially decrease the likelihood that the recipient did in fact input the acceptance phrase with respect to the conditions, because (for a given translation function) there will generally be only one translation string (out of a huge number of potential strings, for example, $2^{160}$ or about $10^{55}$) that could have translated the user's derived unwrap key into the original unwrap key. Hence, the recipient does not gain the ability to claim he unwrapped the digital data in error, without being aware of what he was doing, since selecting and applying the proper translation string is merely an addition to the process of accessing the data.

This invention may have a language skill testing component added in order to aid in determining whether the end user understood the language in which the terms and conditions were presented when he manifested assent to them by entering the acceptance phrase. This testing component may consist of software that asks the user some basic questions (for example, written, verbal, or pictorial) in that language and analyzes the responses input by the user. That the test was in fact performed and passed may be proven by including the answers input by the user (which answers are not supplied with or inside the user's software) as an input to the process of deriving the translation string or the unwrap key. For example, if the correct answers to the Malaysian language test were "A, C, B, D" then the data string "ACBD" might also be required along with the translation string to yield the original unwrap key needed to access and use the wrapped digital data. The test questions can be readily changed by providing a plurality of translation strings for each language, one for each test version. The tests may be identified using URLs to assist the user in obtaining the necessary version. Version labels may be applied to each competency test, translation string, unwrap key, certificate, wrapped message, etc. to permit the user's software to readily determine which test questions and translation string are required to unwrap a given piece of wrapped digital data.

As described herein, the user enters an acceptance phrase in order to unpack packed data. For some applications the user can be provided with the acceptable acceptance phrase and then be asked to enter it by, for example, typing it. In other applications the user may be presented with the acceptance phrase and be given an option to click a button to automatically enter the phrase. These and other ways of entering an acceptance phrase are considered to be part of this invention.

When a signature on a signed transaction or document includes multiple data fields, such as signature attributes as defined in PKCS#7, ANSI X9.45 and elsewhere, it will be clear to one skilled in the art that the wrapping process defined herein can be applied separately to one or more individual fields within the signature block, since the signature block is itself a compound message. In general, digital data to be wrapped can be partitioned in any way and different wrap keys can be formed for any or all of the partitions using the same or different conditions, acceptance phrases and other data for each partition of data.

The disclosed variations for wrapping and unwrapping digital public keys in certificates can also be applied to the wrapping and unwrapping of data fields in digital certificates that contain data other than digital public keys, or to components of any other digital messages, where it may be desired to obtain an end user's assent to conditions prior to allowing access to or use of such data fields or message components. Use of or reliance upon the wrapped data by the end user in a subsequent transaction may be considered as legal evidence that the user performed the act of unwrapping and agreed to the specified terms and conditions.

Multiple documents containing terms and conditions may be combined together to form the wrap and unwrap keys. Different fields in certificates or messages can be wrapped and unwrapped using the same or different terms and conditions for each said field. Subsequent use of or reliance upon data wrapped using multiple terms and conditions documents may be considered as legal evidence that the user agreed to the terms and conditions contained in all documents used to wrap a given data field or component.

The other data 22 to be combined with the conditions 10 and acceptance phrase 16 to form the wrap and unwrap keys 30, 30' may also include supplemental information about the end user and his intended use of the wrapped digital data 36. That is, the legal agreement to which the user must agree may be augmented to include supplemental data elements when forming the wrap and unwrap keys 30, 30'. These supplemental data elements can be any data that could have been included in the contract being agreed to, and might include, for example:

information regarding the end user, such as his name, address, customer number, telephone number, etc.

the end user's intended use of the digital data 32 (after it has been unwrapped), including business purpose, number of copies permitted, machine number(s) on which those copies may run, machine types and operating system types, types of data utilization software, serial numbers of data utilization software shipped to the end user, etc.

the price the end user has paid or agrees to pay for the wrapped digital data 36, including initial payment, installments, renewals, support fees, etc.

the nature and duration of any warranty terms, the liability assumed by the data provider, if any, stated as a monetary value, the date and time the wrapped digital data was packaged or sent, the time after which the user agrees to cease using the digital data, or any other business or technical terms and conditions foreseeable at the time of wrapping and unwrapping.

These supplemental fields can be hashed together in a predetermined order along with the conditions 10, or first substituted directly into the text of the conditions and then hashed, to form a customized set of conditions applicable to the individual user. This value is then included as part of the other data 22 when forming the wrap and unwrap keys 30, 30'.

When sending wrapped digital data 36, the content provider can require the recipient to fill out a form containing the required information, receive the information from the user and check it for validity, wrap the digital data using that information, with the conditions and assent phrase, and send the wrapped data to the recipient. The recipient can then utilize the same required information, still stored in the memory of their computer, along with the conditions and assent phrase, to form the unwrap key and unwrap the digital data.

If the wrapped digital data consists of a signature on a specific business transaction, the wrapping process can require the recipient to obtain additional information from a third party. For example, the sender who wraps the digital data may possess a document from a third party pertaining (for example) to the subsequent use of the wrapped digital data. This agreement may be hashed in computing the wrap and unwrap keys, so that the recipient of the wrapped signature must also obtain that additional documentation from the third party and agree to its contents when computing the unwrap key. That document could in turn also be wrapped (either in its entirety, or as to its signature) under another set of conditions, giving rise to a chain of conditions that must be assented to in order to validate the wrapped signature on the first transaction. If the additional document were to contain a sequentially numbered value along with a random value, then the recipient's use of a series of wrapped data messages can be made contingent on obtaining a series of numbered documents from a third party. This has significant implications for the design of cryptographic transaction control systems.

As shown herein, many of the processes of the invention are performed in sequence. While sequential exposition is used for purposes of explanation, it is understood that simultaneous or parallel execution will be performed where appropriate, and that precomputation can be used to save time in some cases by computing certain intermediate values prior to their being required in forming or receiving a specific message.

The present invention can be implemented in software, hardware or any combination thereof. When implemented fully or partially in software, the invention can reside, permanently or temporarily, on any memory or storage medium, including but not limited to a RAM, a ROM, a disk, an ASIC, a PROM and the like.

Thus, a method of electronic cryptographic packing is provided. One skilled in the art will appreciate that the present invention can be practiced by other than the described embodiments, which are presented for purposes of illustration and not limitation, and the present invention is limited only by the claims that follow.

What is claimed:

1. A method of providing wrapped digital data that is unusable while wrapped, the method comprising:

providing first digital data to be wrapped;

providing second digital data comprising data representing conditions of use of the first digital data;

determining an acceptance phrase to indicate acceptance of the conditions;

deriving a wrapping key from at least digital data representing the acceptance phrase and from the second digital data; and wrapping the first digital data using the wrapping key.

2. A method as in claim 1, wherein the second digital data further comprises a random value.

3. A method as in claim 1 wherein the deriving the key comprises obtaining a digest of digital data representing the acceptance phrase.

4. A method as in claim 3 wherein the obtaining of the digest comprises hashing the digital data representing the acceptance phrase.

5. A method as in claim 1 wherein the first digital data comprises data representing at least one of: software, a cryptographic key, the root key in a public key infrastructure, an identifying certificate, an authorizing certificate, a data file representing an image, data representing text, numbers, audio, and video.

6. A method of unwrapping wrapped digital data such that the wrapped data is unusable while wrapped and such that the wrapped data must be unwrapped by a key formed from a particular acceptance phrase, the method comprising:

obtaining second digital data comprising conditions of use of the wrapped digital data;

obtaining the particular acceptance phrase, the phrase indicating acceptance of the conditions;

generating a key from at least the digital data representing the acceptance phrase and the second digital data; and unwrapping the wrapped digital data using the key.

7. A method as in claim 6, wherein the second digital data further comprises a random value.

8. A method as in claim 7 wherein the deriving of the cryptographic key comprises obtaining a digest of digital data representing the acceptance phrase.

9. A method as in claim 8 wherein the obtaining of the digest comprises hashing the digital data representing the acceptance phrase.

10. A method as in claim 9 wherein the acceptance phrase is obtained in response to displaying the conditions to the user.

11. A method as in claim 1 wherein the first digital data is a subscriber's public key in a public key infrastructure, and wherein the digital data representing the wrapped subscriber's public key is stored in a digital certificate issued to the subscriber.

12. A method as in claim 6 wherein the first digital data is a subscriber's public key in a public key infrastructure, and wherein digital data representing the wrapped subscriber's public key is stored in a digital certificate issued to the subscriber.

13. A method as in claim 12 further comprising using the unwrapped digital data to verify the subscriber's digital signature on a digitally signed message.

14. A method as in claim 1 further comprising:
a certification authority issuing to a subscriber digital data representing a digital certificate;
forming, as said first digital data, a hash value of the content of the digital data representing the subscriber's digital certificate;
by the certification authority, digitally signing the wrapped hash value; and
appending the digital data representing the digitally signed wrapped hash value to the certificate content.

15. A method as in claim 6 further comprising:
a certification authority issuing to a subscriber digital data representing a digital certificate;
forming a hash value of the digital data representing the content of the subscriber's digital certificate;
wrapping the hash value with the key;
verifying a wrapped digital signature on the digital certificate using the wrapped hash value and a public key of the certification authority.

16. A method of providing digital data representing a digital identification certificate in a public key infrastructure wherein a certification authority issues identification certificates to subscribers, the method comprising:
providing first digital data representing a subscriber public cryptographic key for a subscriber;
providing second digital data comprising conditions of use of the subscriber public cryptographic key;
determining an acceptance phrase to indicate acceptance of the conditions;
determining a wrapping key value based on at least the digital data representing the particular acceptance phrase and on the second digital data;
encrypting the digital data representing the subscriber public key using the wrapping key; and
providing the digital data representing the encrypted subscriber public key in the certificate.

17. A method as in claim 16 wherein the determining of the wrapping key comprises:
hashing the digital data representing the acceptance phrase;
hashing the first digital data; and
combining the hashes of the first digital data and of the digital data representing the acceptance phrase to form the wrapping key.

18. A method as in claim 17 wherein the combining further comprises combining the hashes with a random value to form the wrapping key.

19. A method as in claim 18 further comprising:
when the wrapping key value is determined using a random value, storing digital data representing the random value as a field in the certificate.

20. A method as in claim 17 wherein the combining further comprises combining data from the certificate to form the wrapping key.

21. A method as in claim 20 wherein the data from the certificate includes at least one of a certificate number and a name of the certificate issuer.

22. A method of verifying a digital signature in a public key infrastructure wherein a certification authority (CA) issues an identification certificate to a subscriber, the certificate including a version of the subscriber's public key encrypted with a wrap key formed using at least digital data representing conditions of the CA and digital data representing a particular assent phrase, the method of a relying party comprising:
verifying the CA's digital signature on the certificate;
obtaining digital data representing the conditions of the CA;
inputting an acceptance phrase indicating acceptance of the conditions;
determining an unwrap cryptographic key from a first function of the digital data representing the conditions and from a second function of digital data representing the acceptance phrase;
decrypting the encrypted subscriber's public key using the unwrap cryptographic key; and
verifying the digital signature using the subscriber's public key.

23. A method as in claim 22 wherein at least one of the first function and the second function is a hash function.

24. A method as in claim 22 wherein the subscriber's public key is encrypted with a key formed from at least digital data representing conditions of the CA, digital data representing a particular assent phrase and a random value, and wherein the random value is stored in the subscriber's digital certificate, wherein determining of the unwrap cryptographic key comprises:
combining a hash of the digital data representing the conditions, a hash of the digital data representing the acceptance phrase and a function of the random value.

25. A method as in claim 23 wherein the function of the random value is the random value itself.

26. A method of providing a digital identification certificate in a public key infrastructure wherein a certification authority (CA) issues the identification certificate to a subscriber, the method comprising:
determining a wrapping key value based on at least digital data representing a particular acceptance phrase and digital data representing conditions of the CA;
hashing the content of the certificate;
encrypting the hashed content of the certificate using the wrapping key value to form a wrapped hashed content value;
digitally signing the wrapped hashed content value using a private key of the CA to form a signature; and
appending the signature to the certificate.

27. A method of verifying a digital signature in a public key infrastructure wherein a certification authority (CA) issues an identification certificate to a subscriber, an encrypted hash of the certificate being digitally signed by the CA, the hash being encrypted with a wrap key formed from conditions of the CA and digital data representing a particular assent phrase, the method by a relying party comprising:

obtaining digital data representing the conditions of the CA;

inputting an acceptance phrase in response to said obtaining;

determining an wrapping cryptographic key value from at least a hash of digital data representing the digital data representing the conditions and a hash of the digital data representing the acceptance phrase;

wrapping a hash of the content of the certificate using the wrapping key value to form a wrapped hashed content value;

verifying the CA's digital signature using the wrapped hashed content and a public key of the CA.

28. A method of forming a digital signature on a digital message in a public key infrastructure wherein a certification authority (CA) issues a certificate to a subscriber, the method comprising:

obtaining digital data representing conditions to be accepted by a relying party;

determining an acceptance phrase;

hashing the digital message;

encrypting the hashed digital message using a cryptographic key value formed from at least a hash of the digital data representing the conditions to be accepted and a hash of the digital data representing the acceptance phrase;

forming a subscriber signature for the message by digitally signing the encrypted hashed digital message using a private cryptographic key of the subscriber; and appending the subscriber signature to the message.

29. A method as in claim 28 wherein the certificate issued by the CA is an identification certificate including digital data representing the subscriber's public cryptographic key which corresponds to the private cryptographic key used to form the subscriber signature.

30. A method of verifying a digital signature on a digital message in a public key infrastructure wherein a certification authority (CA) issues a certificate to a subscriber, the method by a relying party comprising:

obtaining digital data representing the identity certificate issued to the subscriber by the CA, the certificate including digital data representing the subscriber's public key;

obtaining digital data representing conditions of the issuing CA;

inputting an acceptance phrase;

hashing the digital message;

encrypting the hashed digital message using a cryptographic key value formed from at least a hash of the digital data representing the conditions and a hash of digital data representing the acceptance phrase; and verifying the subscriber's signature using the encrypted hash of the digital message.

31. A method of verifying a digital signature on a digital message in a public key infrastructure wherein a certification authority (CA) issues a certificate to a subscriber, said digital signature having been created using a reversible digital signature algorithm, the method by a relying party comprising:

obtaining digital data representing the identity certificate issued to the subscriber by the CA, the certificate including digital data representing the subscriber's public key;

obtaining digital data representing conditions of the issuing CA;

inputting an acceptance phrase;

hashing the digital message;

verifying the subscriber's signature by using the subscriber's public key to reverse the signing process and recover encrypted hash of the digital message;

decrypting the encrypted hash of the digital message recovered from the subscriber's signature using a cryptographic key value formed from at least a hash of the digital data representing the conditions and a hash of digital data representing the acceptance phrase;

comparing the decrypted hash of the digital message with the hash of the digital message; and accepting the digital message as valid only if the two hash values are identical.

32. A method as in claim 1 wherein the first digital data contains an embedded glyph value and wherein the second digital data further comprises a function of the glyph value.

33. A method as in claim 32 wherein the function of the glyph value is provided with the wrapped data.

34. A method as in claim 1 wherein the function of the glyph value is selected from a keyed hash function and a cryptographic hash function.

35. A method as in claim 6 wherein the digital data contains an embedded glyph value and wherein the second digital data further comprises a function of the glyph value.

36. A method as in claim 1 wherein said second digital data comprises data representing said conditions for each of a plurality of different languages and wherein said wrapping key is derived from a hash value of the conditions in each of the languages.

37. A method as in claim 36 wherein the wrapping key is derived from a plurality of different acceptance phrases corresponding to each of the plurality of different languages.

38. A method as in claim 6 wherein said second digital data comprises data representing said conditions for each of a plurality of different languages and wherein said wrapping key is derived from a hash value of the conditions in each of the languages.

39. A method as in claim 38 wherein the wrapping key is derived from a plurality of different acceptance phrases corresponding to each of the plurality of different languages.

40. A method as in claim 39 further comprising:

selecting a particular language; and determining a user's competence in the particular language, wherein the particular acceptance phrase is obtained for the particular language.

41. A method of providing digital data representing a digital identification certificate in a public key infrastructure wherein a certification authority (CA) issues identification certificates to subscribers, the method comprising:

providing first digital data representing a subscriber public cryptographic key for a subscriber;

providing second digital data comprising conditions of use of the subscriber public cryptographic key;

determining an acceptance phrase to indicate acceptance of the conditions;

determining a wrapping key value based on at least the digital data representing the particular acceptance phrase and on the second digital data;

encrypting the digital data representing the subscriber public key using the wrapping key;

inserting the digital data representing the encrypted subscriber public key into a first certificate;

forming a digital signature using the first certificate and a private key of the CA;

inserting the digital data representing the subscriber public key into a second certificate; and appending the digital signature to the second certificate and providing the second certificate as a digital identification certificate.

42. A method of verifying a digital signature in a public key infrastructure wherein a certification authority (CA) issues an identification certificate to a subscriber, the certificate including the subscriber's public key and having a digital signature formed from a different version of the identification certificate, the different version including an encrypted version of the subscriber's public key, the method of a relying party comprising:

forming the different version of the certificate; and verifying the CA's digital signature on the different version of the certificate, wherein the forming the different version comprises:

obtaining digital data representing the conditions of the CA;

inputting an acceptance phrase indicating acceptance of the conditions;

determining a cryptographic key from a first function of the digital data representing the conditions and from a second function of digital data representing the acceptance phrase;

encrypting the encrypted subscriber's public key using the wrap cryptographic key; and replacing the subscriber's public key in the certificate with the encrypted subscriber's public key.

* * * * *